United States Patent
Mutschler et al.

(10) Patent No.: US 10,885,663 B2
(45) Date of Patent: Jan. 5, 2021

(54) METHOD FOR SETTING A VIEWING DIRECTION IN A REPRESENTATION OF A VIRTUAL ENVIRONMENT

(71) Applicant: Fraunhofer-Gesellschaft zur Förderung d.a. F. e.V., Munich (DE)

(72) Inventors: Christopher Mutschler, Cadolzburg (DE); Tobias Feigl, Dachsbach (DE); Christian Daxer, Happurg (DE); Stephan Otto, Heroldsberg (DE); Bercea Cosmin-Ionut, Nuremberg (DE)

(73) Assignee: Fraunhofer-Gesellschaft zur Foerderung der angewandten Forschung e. v., Munich (DE)

( * ) Notice: Subject to any disclaimer, the term of this patent is extended or adjusted under 35 U.S.C. 154(b) by 130 days.

(21) Appl. No.: 16/302,110

(22) PCT Filed: Apr. 27, 2017

(86) PCT No.: PCT/EP2017/060088
§ 371 (c)(1),
(2) Date: Nov. 16, 2018

(87) PCT Pub. No.: WO2017/198441
PCT Pub. Date: Nov. 23, 2017

(65) Prior Publication Data
US 2019/0180471 A1    Jun. 13, 2019

(30) Foreign Application Priority Data

May 18, 2016    (DE) ........................ 10 2016 109 153

(51) Int. Cl.
*G06T 7/73*    (2017.01)
*G06F 3/01*    (2006.01)
(Continued)

(52) U.S. Cl.
CPC ............ *G06T 7/73* (2017.01); *G02B 27/0172* (2013.01); *G06F 3/011* (2013.01); *G06F 3/012* (2013.01);
(Continued)

(58) Field of Classification Search
CPC ......... G06T 2207/30244; G06T 3/0006; G06T 7/73; G06T 7/74; G02B 2027/0138;
(Continued)

(56) References Cited

U.S. PATENT DOCUMENTS

| | | | |
|---|---|---|---|
| 10,596,700 B2* | 3/2020 | Corkum | B25J 9/1692 |
| 2018/0126547 A1* | 5/2018 | Corkum | G05B 19/423 |
| 2018/0126553 A1* | 5/2018 | Corkum | B25J 9/1692 |

FOREIGN PATENT DOCUMENTS

JP      2003344018 A    12/2003

* cited by examiner

*Primary Examiner* — Diane D Mizrahi
(74) *Attorney, Agent, or Firm* — 2SPL Patent Attorneys PartG mbB; Kieran O'Leary

(57) ABSTRACT

A method for setting a direction of view in a representation of a virtual environment is disclosed. The method includes recording a known object in a real environment using a recording device. Further, the method includes determining a rotational offset of the direction of view in the representation of the virtual environment around a yaw axis of the representation of the virtual environment based on the recording of the object, a known position of the recording device in the real environment and a current direction of view in the representation of the virtual environment. The method further includes rotating the direction of view in the representation of the virtual environment by the rotational offset.

23 Claims, 10 Drawing Sheets

(51) Int. Cl.
*G02B 27/01* (2006.01)
*G06T 3/00* (2006.01)
(52) U.S. Cl.
CPC .............. *G06T 3/0006* (2013.01); *G06T 7/74* (2017.01); *G02B 2027/0138* (2013.01); *G06T 2207/30244* (2013.01)
(58) Field of Classification Search
CPC .... G02B 27/0172; G02B 27/06; G02B 30/27; G02B 2027/0187; G06F 3/012; G06F 3/011; G06F 3/013; H04M 2250/52
See application file for complete search history.

METHOD FOR SETTING A VIEWING DIRECTION IN A REPRESENTATION OF A VIRTUAL ENVIRONMENT

TECHNICAL FIELD

Embodiments relate to the representation of a virtual environment. In particular, embodiments relate to a method for setting a direction of view in a representation of a virtual environment.

BACKGROUND

The representation and simultaneous perception of a computer-generated interactive virtual environment and its physical characteristics is called virtual reality (VR). To generate a feeling of immersion, a representation of the virtual environment may be transferred to a user e.g. via a display device mounted to the head of the user. Such devices are known as Head-Mounted Display (HMD), Head-Mounted Display Unit or Head-Mounted Unit (HMU). The display device represents the virtual environment e.g. on a near-to-eye display or projects it directly to the retina of the user. The orientation, i.e. the direction of view, in the representation of the virtual environment is here set by rotating around a transverse axis (pitch axis) of the representation of the virtual environment, rotating around a longitudinal axis (roll axis) of the representation of the virtual environment and/or rotating around a vertical axis (yaw axis, normal axis) of the representation of the virtual environment. The pitch axis, the roll axis and the yaw axis here are perpendicular to one another.

To adapt the representation of the virtual environment to movements of the user, i.e. to navigate through the virtual environment according to the movements of the user, the position of the head of the user may be detected. For example, a position and an orientation of the head of the user in the real environment, i.e. the real world, may be determined to adapt the representation of the virtual environment. Accordingly, the perception of one's own person in the real environment may be reduced and identification with the virtual environment be increased. In order to detect the user's head, e.g. the propagation times of a radio signal from one single transmitter at the head of the user to several remote receivers may be used. This way, e.g. by means of a Time-Difference-of-Arrival (TDoA) method, from the different differential times between transmitting the radio signal by the transmitter and receiving the radio signal by the respective receiver, a position of the head of the user may be determined at an accuracy in the single-digit centimeter range. The transmitter may here, e.g., be integrated in a display device mounted to the head of the user or be attached to the head of the user independent of the display device mounted to the head of the user. A user may thus change the represented position in the virtual environment e.g. by freely moving around in the real environment. Alternatively, e.g. via a camera-based method, a time of flight (ToF) method, a round trip time (RTT) method and/or an inertial measurement unit (IMU), the position of the head of the user may be detected.

The orientation of the head of the user may, for example, be determined by a corresponding sensors (e.g. gyroscope, magnetometer, accelerometer) of the display device mounted to the head of the user. When the display device mounted to the head of the user for example comprises a mobile communications device like, e.g., a smartphone and a fixing device for mounting the mobile communications device to the head of the user, sensors already present in the mobile communications device may be utilized for determining the orientation of the head of the user. A user may thus change the direction of view in the virtual environment e.g. by rotating or tilting the head in the real environment. When rotating the head in the real environment e.g. the direction of view in the virtual environment is changed by rotating around the yaw axis of the representation of the virtual environment. For example, the magnetometer may be used to determine the orientation in the real environment in a sufficiently stable way. For a self-contained area in the real environment e.g. a magnetic field map may be generated so that using an accordingly calibrated magnetometer the orientation of the head of the user in the real environment may be determined.

The determination of the orientation of the head of the user by means of the above mentioned sensors may lead to orientation errors, however. Thus, magnetometers may also provide wrong measurement values, so that the measured orientation of the head does not correspond to the real orientation of the head in the real environment. Also an approximate determination of the orientation of the head by coupling the measurement values of a gyroscope and an accelerometer may lead to a discrepancy between the measured and/or determined orientation of the head and the real orientation of the head in the real environment due to measurement errors of the individual sensor elements. Thus, for example, the combination and integration of erroneous measurement values over a longer period of time may lead to deviations between the determined orientation of the head and the real orientation of the head in the real environment. Also frequent and intensive changes of the rotation rate of the sensors (e.g. changing between slow and fast rotation movements of the head) may lead to significant deviations between the determined orientation of the head and the real orientation of the head in the real environment, wherein the error increases with an increase of the rotation rate changes. Accordingly, also the orientation of the representation of the virtual environment which is based on the measurement values is corrupted.

A rotational offset of the direction of view in the representation of the virtual environment around the yaw axis of the representation of the virtual environment up to approx. ±15° is usually not perceived by a user. If a user is e.g. walking straight ahead in the real environment, he may not realize when the direction of view in the representation of the virtual environment deviates by up to approx. ±15° (i.e. the direction of view is rotated by up to 15° to the left and/or right around the yaw axis). In other words: Up to a certain degree the user does not note that in contrast to the real environment he is not moving straight ahead in the virtual environment but at an angle. Larger deviations are noted by the user, however, and reduce the feeling of immersion. Due to the measurement errors of the sensors such an undesirably large rotational offset of the direction of view may result in the representation of the virtual environment. In particular when the user utilizes the representation of the virtual environment over a longer period, due to the integration of the erroneous measurement values a substantial offset of the direction of view may result in the representation of the virtual environment. The notable deviation of the direction of view in the representation of the virtual environment may also lead to a discomfort of the user.

There is thus a demand of providing a possibility for correcting the direction of view in the representation of the virtual environment.

SUMMARY

This object is solved by embodiments of a method for setting a direction of view in a representation of a virtual environment. Here, the method comprises recording a known object in a real environment using a recording device (e.g. an image, video or sound recording). Further, the method comprises determining a rotational offset of the direction of view in the representation of the virtual environment around a yaw axis of the representation of the virtual environment based on the recording of the object, a known position of the recording device in the real environment and a current direction of view in the representation of the virtual environment. The method further comprises rotating the direction of view in the representation of the virtual environment by the rotational offset.

The recording device may spatially be located in close proximity to the user. For example, the recording device may be mounted to the body of the user (like e.g. the head). From the recording of the object and the known position of the recording device in the real environment the orientation of the recording device in the real environment may be determined, which may then approximately be assumed to be the orientation of the head of the user in the real environment. Therefrom, using the information on the current direction of view in the representation of the virtual environment, the rotational offset of the direction of view in the representation of the virtual environment around the yaw axis of the representation of the virtual environment may be determined and the representation of the virtual environment may be corrected accordingly. The representation of the virtual environment may thus be adapted to the actual position and orientation of the head of the user in the real environment. Among other things, embodiments of the proposed method thus allow a calibration of the direction of view in the representation of the virtual environment. An improved feeling of immersion may be generated for the user.

Further embodiments relate to a second method for setting a direction of view in a representation of a virtual environment. Here, the method comprises recording a known object in a real environment using a recording device (e.g. an image, video or sound recording). Further, the method comprises determining a rotational offset of the direction of view in the representation of the virtual environment around a yaw axis of the representation of the virtual environment based on the recording of the object and a current direction of view in the representation of the virtual environment. Additionally, the method comprises rotating the direction of view in the representation of the virtual environment by the rotational offset.

From the recording of the object the orientation of the recording device in the real environment may be determined. If the recording device is spatially located in close proximity to the user (e.g. at the head of the user), the orientation of the recording device in the real environment may approximately be assumed to be the orientation of the head of the user in the real environment. Therefrom, along with the information on the current direction of view in the representation of the virtual environment, the rotational offset of the direction of view in the representation of the virtual environment around the yaw axis of the representation of the virtual environment may be determined and the representation of the virtual environment may be corrected accordingly. The representation of the virtual environment may thus be adapted to the actual position and orientation of the head of the user in the real environment. Among other things, embodiments of the proposed method thus allow a calibration of the direction of view in the representation of the virtual environment. An improved feeling of immersion may be generated for the user.

Further embodiments relate to a third method for setting a direction of view in a representation of a virtual environment. Here, the method comprises recording an object arranged in a real environment at the body of the user using a recording device arranged at the head of the user at a first time instant and at a later second time instant (e.g. an image, a video or a sound recording). Further, the method comprises determining a rotational offset of the direction of view in the representation of the virtual environment around a yaw axis of the representation of the virtual environment based on the recordings of the object at the first time instant and at the second time instant and measurement values of at least one further sensor mounted to the head of the user. The method further comprises rotating the direction of view in the representation of the virtual environment by the rotational offset.

From the recordings of the object at the first time instant and at the second time instant and the measurement values of at least one further sensor mounted to the head of the user each an effective rotation of the recording device around the yaw axis of the head of the user between the first time instant and the second time instant may be determined. The difference between the two determined values for the rotation of the recording device around the yaw axis of the head of the user may approximately be assumed to be the rotational offset of the direction of view in the representation of the virtual environment around the yaw axis of the representation of the virtual environment. The representation of the virtual environment may thus be corrected accordingly. The representation of the virtual environment may thus be adapted to the actual position and orientation of the head of the user in the real environment. Among other things, embodiments of the proposed method thus allow a calibration of the direction of view in the representation of the virtual environment. Thus, an improved feeling of immersion may be generated for the user.

In a further aspect, embodiments comprise a program having a program code for executing at least one of the proposed methods, when the program code is executed on a computer, a processor, or a programmable hardware component.

BRIEF DESCRIPTION OF THE FIGURES

Embodiments are explained in more detail with reference to the accompanying Figures, in which:

FIG. 6 shows an example of a histogram of certain orientations of the recording device in the real environment;

FIG. 9b shows a binary recording corresponding to the recording illustrated in FIG. 9a;

DESCRIPTION

Figure 1:
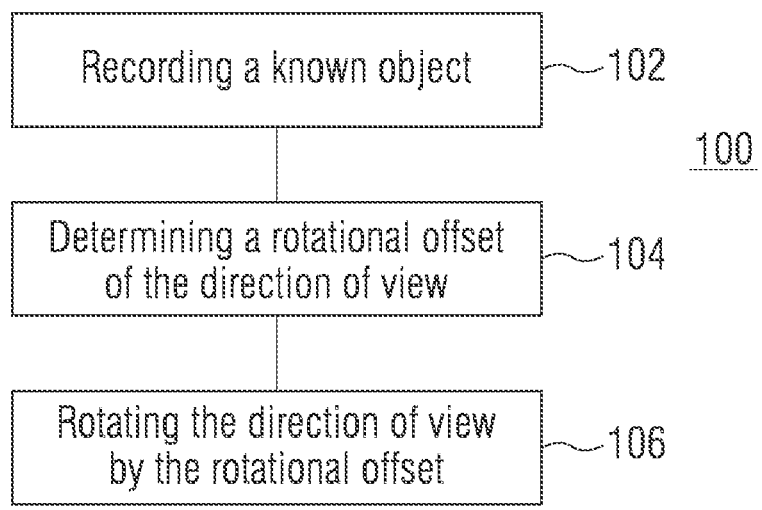
FIG. 1 shows an example of a method for setting a direction of view in a representation of a virtual environment.

Various embodiments will now be described with reference to the accompanying drawings in which some example embodiments are illustrated. In the Figures, the thicknesses of lines, layers and/or regions may be exaggerated for clarity.

Like numbers refer to like or similar components throughout the following description of the included figures, which merely show some exemplary embodiments. Moreover, summarizing reference signs will be used for components and objects which occur several times in one embodiment or in one Figure but are described at the same time with respect to one or several features. Components and objects described with like or summarizing reference signs may be implemented alike or also differently, if applicable, with respect to one or more or all the features, e.g. their dimensioning, unless explicitly or implicitly stated otherwise in the description.

Although embodiments may be modified and changed in different ways, embodiments are illustrated as examples in the Figures and are described herein in detail. It is to be noted, however, that it is not intended to restrict embodiments to the respectively disclosed forms but that embodiments rather ought to c any functional and/or structural modifications, equivalents and alternatives which are within the scope of the invention. Same reference numerals designate same or similar elements throughout the complete description of the figures.

It is noted, that an element which is referred to a being "connected" or "coupled" to another element, may be directly connected or coupled to the other element or that intervening elements may be present. If an element is referred to as being "directly connected" or "directly coupled" to another element, no intervening elements are be present. Other terms used to describe a relationship between elements ought to be interpreted likewise (e.g. "between" versus "directly between", "adjacent" versus "directly adjacent", etc.).

The terminology used herein only serves for the description of specific embodiments and should not limit the embodiments. As used herein, the singular form such as "a," "an" and "the" also include the plural forms, as long as the context does not indicate otherwise. It will be further understood that the terms e.g. "comprises," "comprising," "includes" and/or "including," as used herein, specify the presence of the stated features, integers, steps, operations, elements and/or components, but do not preclude the presence or addition of one and/or more other features, integers, steps, operations, elements, components and/or any group thereof.

Unless otherwise defined, all terms (including technical and scientific terms) are used herein in their ordinary meaning of the art to which the examples belong and given to same by a person of ordinary skill in the art. It is further clarified that terms like e.g. those defined ion generally used dictionaries are to be interpreted to have the meaning consistent with the meaning in the context of relevant technology, as long as it is not expressly defined otherwise herein.

FIG. 1 shows a method 100 of setting a direction of view in a representation of a virtual environment. The virtual environment is a computer-generated interactive world with predetermined physical characteristics which are e.g. output to a user. The direction of view in the representation of the virtual environment here corresponds to the orientation (alignment) of the section of the virtual environment illustrated in the representation of the virtual environment in the virtual environment. The representation of the virtual environment may, for example, represent the virtual environment from a first-person view or first-person perspective, i.e. the virtual environment may be represented or reproduced as a user would see it if he or she actually moved around in the virtual environment. Accordingly, the direction of view in the representation of the virtual environment would correspond to the direction of view of the user if he or she actually moved around in the virtual environment. The direction of view in the representation of the virtual environment is here set by rotating around the transverse axis of the representation of the virtual environment, rotating around the longitudinal axis of the representation of the virtual environment and/or rotating around the yaw axis of the representation of the virtual environment.

Here, the method 100 comprises recording 102 a known object in a real environment (i.e. the real world) using a recording device. The known object may both be an object in the real environment especially placed for the proposed method and also an object already existing in the real environment. For example, the object may be placed in an area of the real environment in which the user moves around or an already existing element of this area. The object may both be a basically two-dimensional (planar) object, i.e. an object basically extending only in two spatial directions, and also a three-dimensional object, i.e. an object extending in similar dimensions or orders of magnitude in all three spatial directions. If the user moves in the real environment, e.g. within a room or a hall, the known object may e.g. be an object of the room and/or hall, like e.g. a window, an illumination device, a door, a post, a carrier, a piece of furniture or another element of the room and/or the hall. Alternatively, the object may e.g. be a poster, a projection, a sound source or another element which has especially been placed in the room and/or hall for the proposed method.

The recording may e.g. be a still picture (i.e. a single recording), a video (i.e. a sequence of images) or a sound recording, i.e. a recording of sound (e.g. sounds, noises, music or speech). Accordingly, the recording device may comprise a still camera, a video camera, a (stereo) sound recording device or a combination thereof.

Further, the method 100 comprises determining 104 a rotational offset of the direction of view in the representation of the virtual environment around the yaw axis of the representation of the virtual environment based on the recording of the object, a known position of the recording device in the real environment and a current direction of view in the representation of the virtual environment. The recording device may spatially be arranged in close proximity to the user. A position of the user in the real environment measured during regular operation of a VR system may then e.g. be used as the position of the recording device. If the position of the user is determined e.g. by a time of flight measurement, as described hereinabove, the transmitter may e.g. be arranged at the head of the user and the recording device in spatial proximity to the same to detect the position of the recording device in the real environment as exactly as possible. The current direction of view in the representation of the virtual environment may, for example, be received by a display device (e.g. HMD, HMU) which outputs the representation of the virtual environment to the user (and optionally calculates the same) or by a computer which calculates the virtual environment (e.g. back end of a VR system).

From the recording of the object and the known position of the recording device in the real environment the orientation of the recording device in the real environment may be determined, which may approximately be assumed to be the orientation of the user or his/her head in the real environment. Therefrom, using the information on the current direction of view in the representation of the virtual environment, the rotational offset of the direction of view in the representation of the virtual environment around the yaw axis of the representation of the virtual environment may be determined. Some examples for the determination of the orientation of the recording device in the real environment and also for the determination of the rotational offset of the direction of view in the representation of the virtual environment are explained in more detail in the following description.

The method 100 further comprises rotating 106 the direction of view in the representation of the virtual environment by the rotational offset. In other words: The direction of view in the representation of the virtual environment is corrected by a rotation around the yaw axis of the representation of the virtual environment, wherein the direction and the magnitude of the rotation are determined by the rotational offset. The representation of the virtual environment is thus corrected by the rotational offset. The representation of the virtual environment may thus be adapted to the actual position and orientation of the head of the user in the real environment. Among other things, the method 100 thus allows a calibration of the direction of view in the representation of the virtual environment. In particular, using the method 100 an erroneously determined orientation in the real environment and/or a drifting of the direction of view in the representation of the virtual environment caused by measurement errors of the conventionally used sensors for determining the position and the alignment (of the head) of a user may be corrected.

As already indicated above, the method may in some embodiments further comprise outputting the representation of the virtual environment to a user. Outputting the representation of the virtual environment to the user may here e.g. be executed via a display device mounted to the head of the user which further comprises the recording device. In such an arrangement the orientation of the recording device in the real environment may approximately be assumed to be the orientation of the head of the user in the real environment.

In some embodiments, the display device mounted to the head of the user comprises a mobile communications device (e.g. a smartphone). As indicated above, in a conventional operation of the VR system sensors already existing in the mobile communications device (e.g. gyroscope, magnetometer, accelerometer) may be used for determining the orientation of the head of the user in the real environment. By using the camera of the mobile communications device as a recording device, a rotational offset of the direction of view in the representation of the virtual environment around the yaw axis of the representation of the virtual environment due to measurement errors of the sensors of the mobile communications device may be corrected. For the calibration of the representation of the virtual environment, thus resources may be used already provided by the mobile communications device. In other words: The method 100 may be executed directly (i.e. online) on the mobile communications device. The method 100 may thus enable a calibration of the representation of the virtual environment without additional hardware components. Alternatively, e.g. a part of the method 100 may be executed by the mobile communications device and another part of the method 100, like e.g. determining 104 the rotational offset of the direction of view in the representation of the virtual environment around the yaw axis of the representation of the virtual environment may be executed by an already existing back end of the VR system used by the user (i.e. offline). The determined rotational offset may then e.g. be transmitted from the back-end to the mobile communications device so that the same may rotate the direction of view in the current representation of the virtual environment by the rotational offset. The above described functionality may e.g. be implemented by an update for one or several already existing software components of the VR system (e.g. software for the mobile communications device or software for the back end).

In some embodiments, determining 104 the rotational offset of the direction of view in the representation of the virtual environment around the yaw axis of the representation of the virtual environment may comprise determining an orientation of the recording device in the real environment based on the recording of the object and the known position of the recording device in the real environment (exemplary methods will be discussed in the following). Further, determining 104 the rotational offset may comprise determining a target direction of view in the representation of the virtual environment based on the orientation of the recording device in the real environment. For example, the determined orientation of the recording device in the real environment may be provided to an algorithm for the calculation of the representation of the virtual environment based which calculates a representation of the virtual environment based thereon. In particular when the recording device is arranged at the head of the user, the target direction of view in the virtual environment may be the direction of view in the virtual environment which corresponds to the actual position and orientation of the head of the user in the real environment. For example, the recording device may be aligned straight ahead in the direction of view of the user in the real environment or vertically to the same. The direction of view in the calculated representation of the virtual environment may consequently be regarded as the target direction of view.

From the target direction of view in the representation of the virtual environment and the current direction of view in the representation of the virtual environment, according to embodiments, the rotational offset of the direction of view in the representation of the virtual environment around the yaw axis of the representation of the virtual environment is determined. This may, for example, be done by a comparison of the target direction of view and the current direction of view in the representation of the virtual environment. In other words: It is determined to what extent the current direction of view in the representation of the virtual environment is rotated relative to the target direction of view in the representation of the virtual environment around the yaw axis of the representation of the virtual environment.

The representation of the virtual environment may e.g. be rendered by the display device (e.g. including a mobile communications device) mounted to the head of the user. The determination of the target direction of view for a time instant $t_0$ may e.g. be executed by a back end of the VR system and subsequently be transmitted to the mobile communications device mounted to the head of the user. From the target direction of view in the representation of the virtual environment for the time instant $t_0$ and the current direction of view in the representation of the virtual environment at the time instant $t_0$ the mobile communications device may then determine the rotational offset of the direction of view around the yaw axis of the representation of the virtual environment at the time instant $t_0$. Assuming that a further drift of the direction of view in the representation of the virtual environment between the time instant $t_0$ and a later time instant $t_1$ may be neglected, the mobile communications device may e.g. rotate the direction of view in the representation of the virtual environment for the time instant $t_1$ by the rotational offset of the direction of view at the time instant $t_0$, i.e. correct the same. Accordingly, the representation of the virtual environment may be output to the user with a correct direction of view.

The above-described method may be executed repeatedly during the utilization of the VR system. Thus e.g. a further drift of the direction of the direction of view in the representation of the virtual environment between the time instant t0 and at the later time instant $t_1$ may be corrected. Further, after a correction has been executed, the method may at least partially be executed again to verify the preceding correction.

Figure 2:
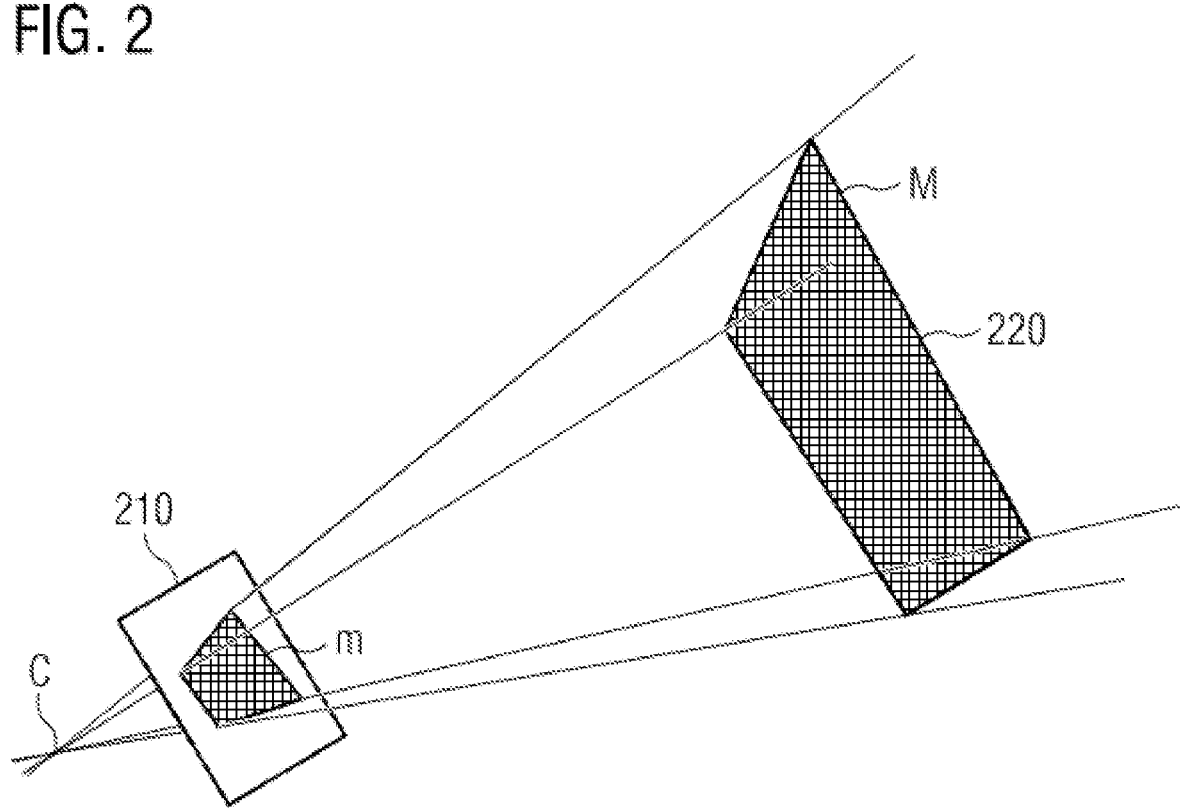
FIG. 2 shows an example of a connection between an object in the real environment and a recording of the object.

In FIG. 2 it is illustrated exemplarily how the orientation of a recording device in the real environment may be determined based on a recording 210 of a known object 220 and a known position C of the recording device in the real environment. The object 220 may be regarded as an amount of world points M. The recording 210 may be regarded as an amount of image points m.

The orientation of the recording device and thus the angle of view in the recording 210 may generally be determined from a transformation which transfers the world points M of the object 220 into corresponding image points m of the recording 210. In general, the transformation may be represented as follows:

$$m = KR[I-C]M \qquad (1),$$

wherein I represents the unity matrix and K and R the breakdown of the camera matrix of the recording device, wherein K represents the intrinsic matrix describing the focal length, the main point of the camera and the deviations of the axes of the image coordinate system from the assumed orthogonality (axis skew), and R represents a general rotational matrix. R may here be represented as a product of three rotational matrices $R_x$, $R_y$ and $R_z$ around unity directions X, Y and Z which are orthogonal to each other. From a defined origin in the real environment e.g. X may point to the right, Y upward (i.e. heavenward) and Z into the depth (i.e. to the front). The unity direction Y thus corresponds to the yaw axis (vertical axis), i.e. a rotation around this axis horizontally shifts a recording. The axes of the coordinate system of the virtual environment may be selected different to the orthogonally arranged unity directions X, Y and Z. One position in the real environment may then be translated into a position in the virtual environment via a coordinate transformation. Accordingly, equation (1) may be transformed as follows:

$$m = KR_x R_y R_z [I-C]M \qquad (2)$$

$$R_z^{-1} K^{-1} m = R_x R_y [I-C]M \qquad (3)$$

The three rotational matrices $R_x$, $R_y$ and $R_z$ may here depend on an angle $\alpha$, which indicates the desired horizontal alignment of the recording device in the real environment. In other words: The angle $\alpha$ defines an orientation (alignment) of the recording device in the planed spanned by X and Z. The rotational matrices $R_x$, $R_y$ and $R_z$ are defined as usual:

$$R_x(\alpha) = \begin{pmatrix} 1 & 0 & 0 \\ 0 & \cos\alpha & -\sin\alpha \\ 0 & \sin\alpha & \cos\alpha \end{pmatrix} \qquad (4)$$

$$R_y(\alpha) = \begin{pmatrix} \cos\alpha & 0 & \sin\alpha \\ 0 & 1 & 0 \\ -\sin\alpha & 0 & \cos\alpha \end{pmatrix} \qquad (5)$$

$$R_z(\alpha) = \begin{pmatrix} \cos\alpha & -\sin\alpha & 0 \\ \sin\alpha & \cos\alpha & 0 \\ 0 & 0 & 1 \end{pmatrix} \qquad (6)$$

Assuming $R_x(\alpha)$, $R_z(\alpha)$, K and C are known, $R_y(\alpha)$ may be determined from a corresponding pair M↔m. $R_x(\alpha)$ and $R_z(\alpha)$ may e.g. be determined using the sensors already existing in the mobile communications device (e.g. via the gravitational vector). Here, the coefficients of equation (3) may be summarized as follows:

$$C_q = R_z^{-1} K^{-1} \qquad (7)$$

$$C_p = R_x [I-C] \qquad (8)$$

Accordingly, equation (3) may be represented as follows:

$$C_q m = R_y C_p M \qquad (9)$$

and/or $$Y = R_y X \qquad (10),$$

wherein $Y = C_q m$ and $X = C_p M$.

Accordingly, equation (10) may be transformed as follows:

$$\begin{pmatrix} u' \\ v' \\ 1 \end{pmatrix} = \begin{pmatrix} \cos\alpha & 0 & \sin\alpha \\ 0 & 1 & 0 \\ -\sin\alpha & 0 & \cos\alpha \end{pmatrix} \begin{pmatrix} u \\ v \\ 1 \end{pmatrix} \qquad (11)$$

Multiplying equation (11) results in the following equation system:

$$u' = \frac{u \cdot \cos\alpha + \sin\alpha}{\cos\alpha - u \cdot \sin\alpha} \qquad (12)$$

-continued $$v' = \frac{v}{\cos\alpha - u\cdot\sin\alpha} \quad (13)$$

$$1 = 1 \quad (14)$$

This equation system may be solved for the angle α as follows:

$$u'\cdot(\cos\alpha - u\cdot\sin\alpha) = u\cdot\cos\alpha + \sin\alpha \quad (15)$$

$$u'\cdot\cos\alpha - u'\cdot u\cdot\sin\alpha = u\cdot\cos\alpha + \sin\alpha \quad (16)$$

$$u'\cdot\cos\alpha - u\cdot\cos\alpha - u'\cdot u\cdot\sin\alpha - \sin\alpha = 0 \quad (17)$$

$$\cos\alpha\cdot(u' - u) - \sin\alpha\cdot(u'\cdot u + 1) = 0 \quad (18)$$

$$\sin\alpha\cdot(-u'\cdot u - 1) + \cos\alpha\cdot(u' - u) = 0 \quad (19)$$

With $(-u'\cdot u - 1) = a$ and $(u' - u) = b$ the following results:

$$a\cdot\sin\alpha + b\cdot\cos\alpha = 0 \quad (20)$$

$$a\cdot\sin\alpha + b\cdot\cos\alpha = \begin{cases} \sqrt{a^2+b^2}\sin\left(\alpha+\tan^{-1}\left(\frac{b}{a}\right)\right) & \text{für alle } a > 0 \\ \sqrt{a^2+b^2}\cos\left(\alpha-\tan^{-1}\left(\frac{a}{b}\right)\right) & \text{für alle } a < 0 \end{cases} \quad (21)$$

From equation (21) it follows:

$$a\cdot\sin\alpha + b\cdot\cos\alpha = \sin\left(\alpha+\tan^{-1}\left(\frac{b}{a}\right)\right) = 0 \quad (22)$$

$$a\cdot\sin\alpha + b\cdot\cos\alpha = \alpha + \tan^{-1}\left(\frac{b}{a}\right) = 0 \quad (23)$$

$$\alpha = -\tan^{-1}\left(\frac{b}{a}\right) = -\tan^{-1}\left(\frac{u'-u}{-u'\cdot u - 1}\right) \text{ für } a = -u'\cdot u - 1 > 0 \quad (24)$$

$$\alpha = -\tan^{-1}\left(-\frac{b}{a}\right) = -\tan^{-1}\left(-\frac{u'-u}{-u'\cdot u - 1}\right) \text{ für } a = -u'\cdot u - 1 > 0 \quad (25)$$

$$\cos\left(\alpha - \tan^{-1}\left(\frac{a}{b}\right)\right) = 0 \quad (26)$$

$$\sin\left(\alpha - \tan^{-1}\left(\frac{a}{b}\right) + \frac{\pi}{2}\right) = 0 \quad (27)$$

$$\alpha = -\tan^{-1}\left(\frac{a}{b}\right) + \frac{\pi}{2} = \tan^{-1}\left(\frac{-u'\cdot u - 1}{u' - u}\right) + \frac{\pi}{2} \text{ für } b = u' - u > 0 \quad (28)$$

$$\alpha = -\tan^{-1}\left(-\frac{a}{b}\right) - \frac{\pi}{2} = -\tan^{-1}\left(\frac{u'\cdot u + 1}{u' - u}\right) - \frac{\pi}{2} \text{ für } b = u' - u > 0 \quad (29)$$

u' and u may be determined for each corresponding pair M↔m so that the angle α may be determined for each pair.

Figure 3A:
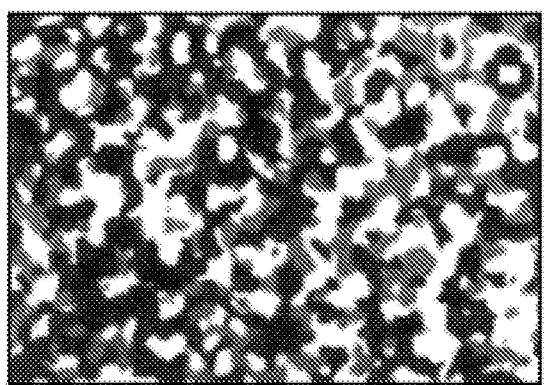
FIG. 3a shows a first example for an object.
Figure 3B:
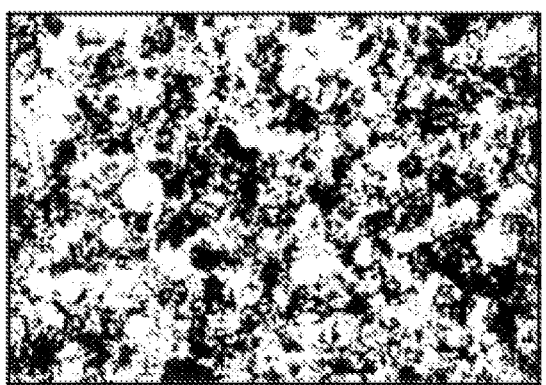
FIG. 3b shows a second example for an object.
Figure 3C:
FIG. 3c shows a third example for an object.
Figure 3D:
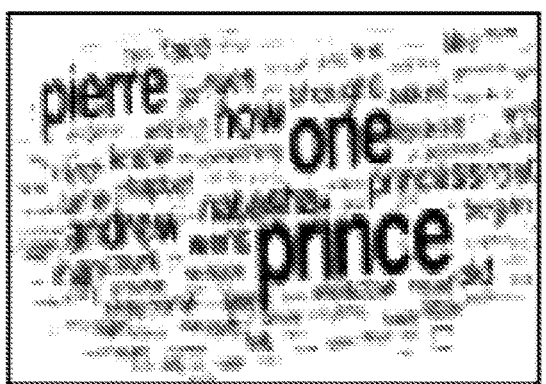
FIG. 3d shows a fourth example for an object.

In FIGS. 3a to 3d some examples for possible objects are illustrated in the following. Here, FIG. 3a shows an amorphous pattern 310 with different grayscales, FIG. 3b a pattern 320 with circles of different sizes and grayscales, FIG. 3c an illustration 330 of trees and FIG. 3d a collage 340 of strings (e.g. words or numbers). As shown in FIGS. 3a to 3d, the object may be manifold. The patterns illustrated in FIGS. 3a to 3d may e.g. be applied to a vertical plane in the real environment (e.g. by means of a poster or by means of projection). For example, the patterns illustrated in FIGS. 3a to 3d may be illustrated at a side wall of a room or a hall in the form of a poster or as a projection. The object is not restricted to the examples of FIGS. 3a to 3d, however. In the following description further examples for possible objects are illustrated.

According to embodiments, determining the orientation of the recording device in the real environment comprises determining a transformation which correlates the at least one part of the recording of the known object with at least one part of a comparison recording. The comparison recording may provide information on the position of the known object in the real environment. For example, a database with comparison recordings may be held available which show different objects and/or an object from different perspectives. Here, for each comparison recording additional information on the position of the illustrated object in the real world are stored (held available). This information which corresponds to the world points M in the example shown in FIG. 2 may be used to determine the orientation of the recording device in the real environment according to the example shown in FIG. 2. In the following, FIGS. 4 to 7 exemplarily show two different approaches for determining the orientation of the recording device in the real environment on the basis of determining a transformation which correlates the at least one part of the recording of the known object with at least one part of a comparison recording.

Figure 4:
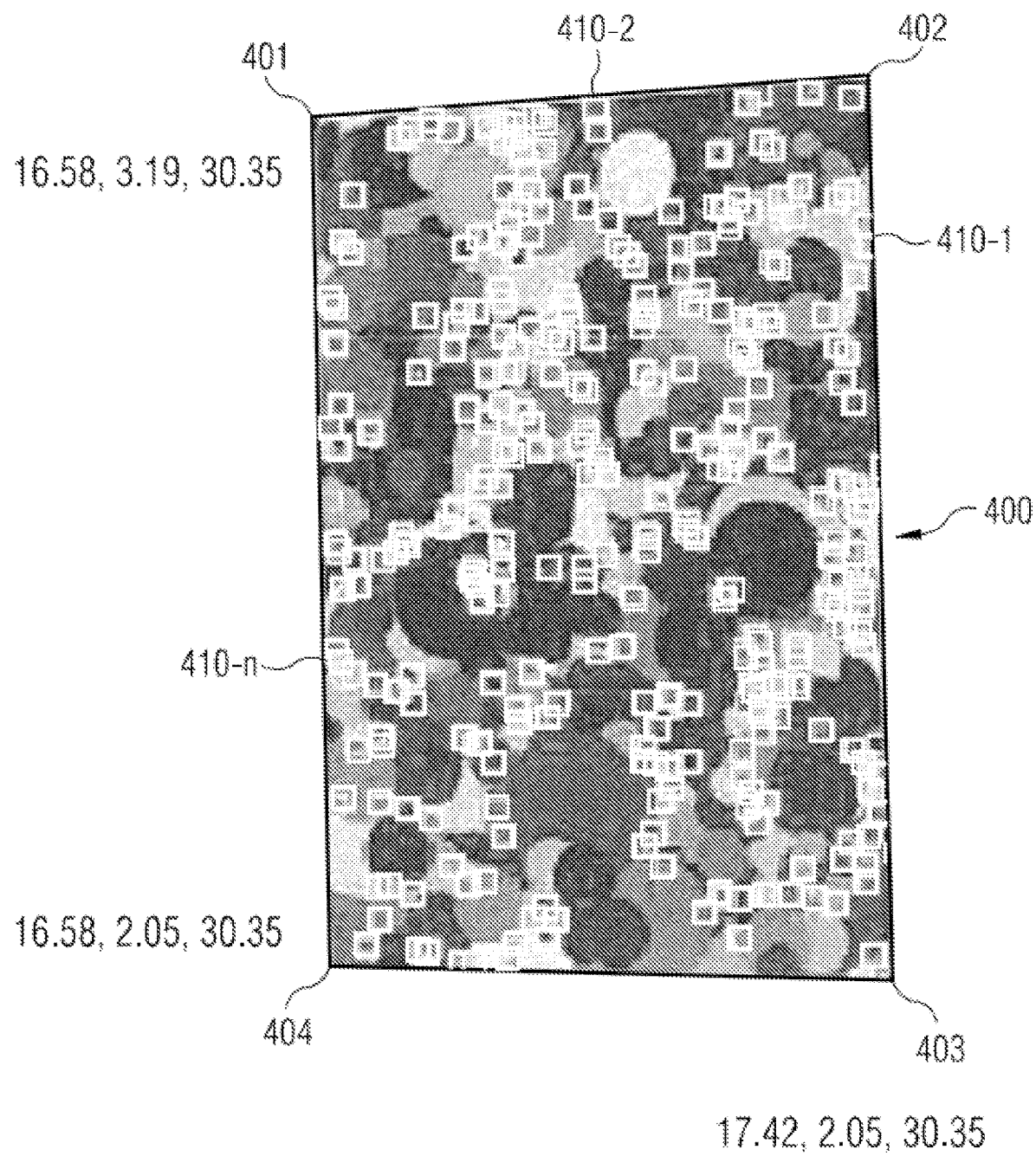
FIG. 4 shows exemplary features in an object.

For explaining the first approach, in FIG. 4 a pattern with circles of different sizes and grayscales is illustrated in the form of a poster 400 attached to a wall of the real environment as an example for an object. The pattern comprises a plurality of features 410-1, 410-2, . . . , 410-*n*. The features 410-1, 410-2, . . . , 410-*n* may be determined by feature extraction methods. Examples for feature extraction methods are e.g. the Scale-Invariant Feature Transform (SIFT) algorithm, the Speeded Up Robust Features (SURF) algorithm or the Binary Robust Independent Elementary Features (BRIEF) algorithm. These features may be stored in a database as comparison features, i.e. the plurality of comparison features of the database may comprise different features of the object. Likewise, the comparison features in the database may come from different recordings of the same object, as the features may be different depending on the direction of view in the comparison recording. Among others, features are only detected by the feature extraction method with a certain angle of view of the recording. If, in case of the exemplary poster 400 which comprises the pattern, the positions of the four corners 401, 402, 403, 404 of the poster 400 are known in the real environment, also to the individual comparison features of the database each a position in the real environment may be associated. In FIG. 4 to each of the corners 401, 402, 403, 404 of the poster 400 an exemplary three-dimensional coordinate related to the real environment is associated (e.g. X=16,58, Y=3,19, Z=30, 35 for the corner 401) so that also for each feature 410-1, 410-2, . . . , 410-*n* a position each in the real environment may be determined. Accordingly, each of the comparison features with its associated position may be stored in the database.

These comparison features may now be utilized for determining the orientation of the recording device in the real environment based on the recording of an object and the known position of the recording device in the real environment. Using the recording device, first of all a recording of the object is made from the known position—in the example shown in FIG. 4 a recording of the poster 400 with the pattern. For example, the recording device is part of a display device for outputting the representation of the virtual environment mounted to the head of the user, so that by measuring the position of the head of the user during operation of the VR system also the position of the recording device is (basically) approximately known.

In the recording at least one feature of the object is detected. In this respect, a feature extraction method is applied to the recording (e.g. one of the above-mentioned algorithms). In the recording of the object itself a position of the feature is further determined. Consequently, the coordinates of the feature in the coordinate system of the recording are determined. Furthermore, a comparison feature from the plurality of comparison features of the database is identified which corresponds to the feature of the object in the recording. As indicated above, a respective position in the real environment is associated with each of the plurality of comparison features. For identification purposes, e.g. known image registration methods may be used. To identify the comparison feature from the plurality of comparison features of the database as fast and efficiently as possible, e.g. a nearest neighbor method may be used receiving the position of the feature in the recording of the object, the position in the real environment of the plurality of comparison features and the known position of the recording device in the real environment as input variables.

From the known position of the recording device in the real environment, the position of the feature in the recording and the position in the real environment associated with the identified comparison feature, now the orientation of the recording device in the real environment may be determined according to the principles illustrated in FIG. 2. Relating to the method illustrated in FIG. 2 for determining the orientation of the recording device in the real environment, the known position from which the poster 400 is recorded corresponds to the known position C of the recording device in the real environment. The position of the feature in the recording corresponds to an image point m and the position in the real environment associated with the identified comparison feature to a world point M. Thus, according to the principles illustrated in FIG. 2, a transformation may be determined which correlates the position of the feature in the recording to the position in the real environment associated with the identified comparison feature. Accordingly, the orientation of the recording device in the real environment may be determined.

As may already be seen from FIG. 4, in one recording of an object several features may be detected. In other words: When determining the orientation of the recording device in the real environment several features of the object may be detected. Accordingly, for the plurality of detected features of the object a plurality of comparison features from the database may be identified. An orientation of the recording device in the real environment may be determined for each of the several detected features of the object.

Figure 5:
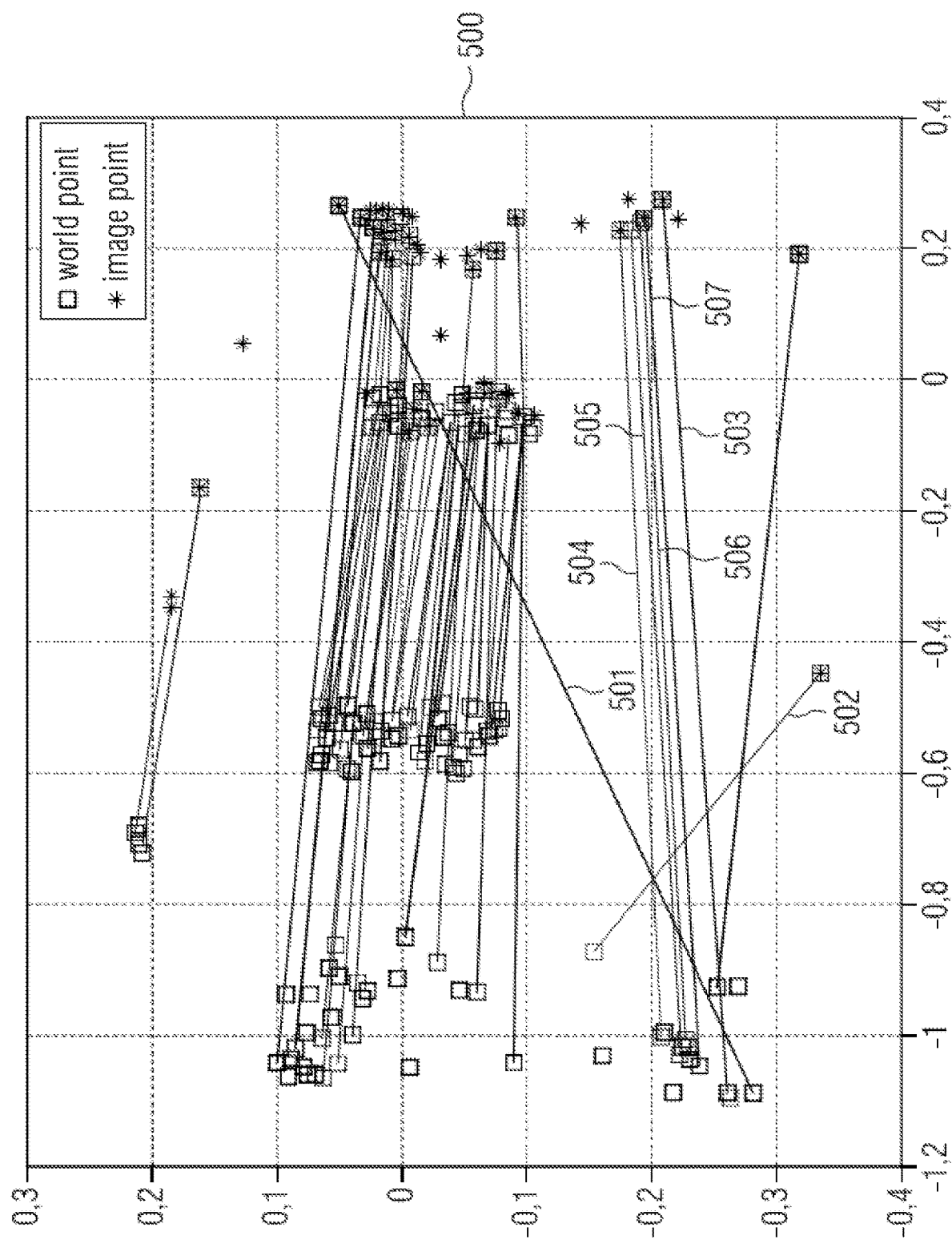
FIG. 5 shows an example of an allocation of the positions of features of an object in the real environment to the position of the respective feature in a recording of the object.

An exemplary allocation 500 of features of the object in the recording to comparison features is depicted in FIG. 5. In FIG. 5 each the position of a feature of the object (image point) detected in the recording of the object and the position in the real environment (world point) allocated to the respective identified comparison feature are illustrated. The positions are here each given in arbitrary units. Corresponding image points and world points are connected with a straight line in FIG. 5. As indicated in FIG. 5, the inclination of the respective straight line—except for lines 501 to 507—is similar. For the allocation of the image points to the world points e.g. Brute-Force or Fast Library for Approximate Nearest Neighbors (FLANN)-based algorithms may be used. As it may basically be seen from parallel straight lines in FIG. 5, thus basically same and/or similar orientations of the recording device in the real environment were determined for the several detected features of the object.

Figure 6:
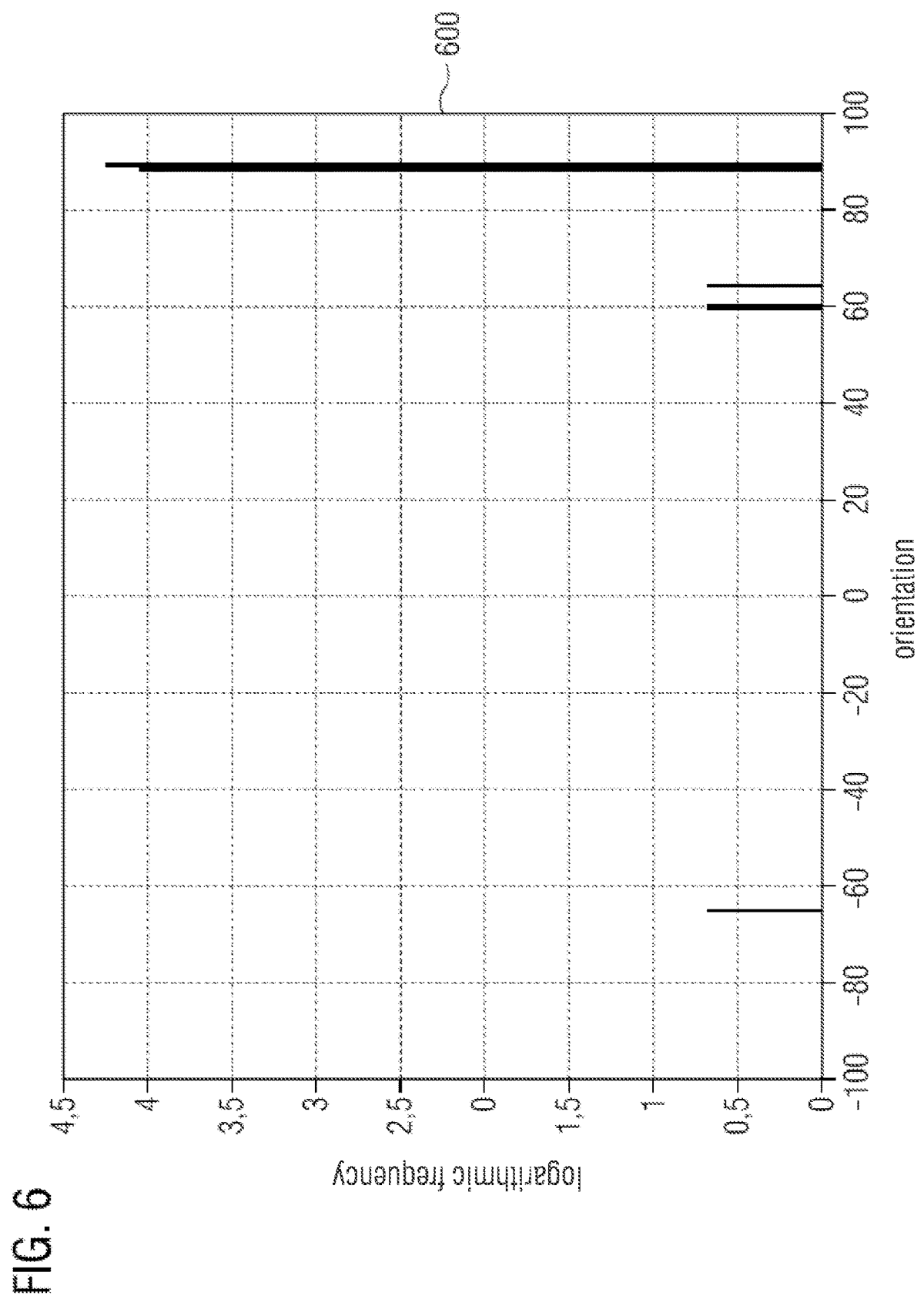

This becomes clearer from the histogram 600 illustrated in FIG. 6 in which the frequencies of the orientations of the recording device in the real environment determined for the several detected features of the object are plotted. The orientation is applied in the form of angle $\alpha$ indicating the rotation around the normal axis of the recording. Regarding the above discussed example with spatial directions X, Y, Z the angle $\alpha$ thus corresponds to an orientation (alignment) of the recording device in the plane spanned by X and Z, i.e. a rotation around Y. The frequency is plotted logarithmically.

It is evident from FIG. 6 that the angle $\alpha$ was determined for some detected features of the object at approx. −65°, for some detected features of the object at approx. 60°, for some detected features of the object at approx. 64°, for far more detected features of the object at approx. 90° and for even more detected features of the object at approx. 91°.

According to embodiments now the one of the orientations of the recording device in the real environment determined for the several detected features of the object which fulfills a quality criterion is determined to be the orientation of the recording device in the real environment. Relating to the example shown in FIG. 6, e.g. the respective one degree wide interval (bin) of the histogram with the greatest number of entries may be selected. The quality criterion may thus e.g. be that the orientation of the recording device in the real environment is the most frequently determined orientation. Apart from that still further quality criteria may be used. It may for example be requested that the selected interval has to comprise a minimum number of entries or that the selected bin has to represent at least a predetermined portion of the several detected features of the object (i.e. the bin has to represent the determined orientation each for the predetermined portion of the several detected features of the object).

In the example shown in FIG. 6, the frequency for 90° and 91° dominant and absolute are in a similar range, so that both orientations may fulfill a selected quality criterion. Accordingly, with neighboring and/or similar orientations (i.e. with neighboring bins or bins only separated by a small number of bins in between) also the average value of the two orientations may be determined as the orientation of the recording device in the real environment. Optionally, also a weighting of the neighboring and/or similar orientations may be executed (e.g. according to their frequency).

In the scope of the description of FIG. 7, in the following the second approach for determining the orientation of the recording device in the real environment on the basis of determining a transformation which correlates the at least one part of the recording of the known object with at least one part of a comparison recording is discussed.

In the second approach determining an orientation of the recording device in the real environment comprises determining a comparison recording from the plurality of comparison recordings of a database. Determining a comparison recording from the plurality of comparison recordings of a database is here based on the known position of the recording device in the real environment. In other words: A comparison recording is selected from the database for which based on the position of the recording device a high likelihood is given that it shows the object at all and/or that is shows the object from the same or a similar perspective. An orientation at least of the selected comparison recording in the real environment is known here. In the database of course also for each of the plurality of comparison recordings the orientation in the real environment may each be stored.

Furthermore, determining the orientation of the recording device in the real environment comprises determining a rotation of the recording of the object relative to the comparison recording. I.e., an image registration of the recording of the object with respect to the comparison recording is executed. For this purpose, known image registration methods may be used, like e.g. the Enhanced Correlation Coefficient (ECC) algorithm. In this respect, the recording of the object may e.g. be rotated stepwise with respect to the comparison recording, as indicated by the sequence of recordings 701 to 710 in FIG. 7. In the recordings 701 to 710 each a roof window is illustrated as an example for an object in the real environment in which the user moves around. The recordings are here each rotated counter-clockwise from left to right by 1° each. For each rotation the ECC algorithm determines a correlation with the comparison image. Subsequently, the best correlation is selected and a corresponding transformation matrix is determined. From the transformation matrix again the orientation, i.e. the rotation of the recording of the object relative to the comparison recording may be determined.

From the orientation of the comparison recording in the real environment and the rotation of the recording of the object relative to the comparison recording further the orientation of the recording device in the real environment may be determined (by a combination of both pieces of information).

Figure 7:
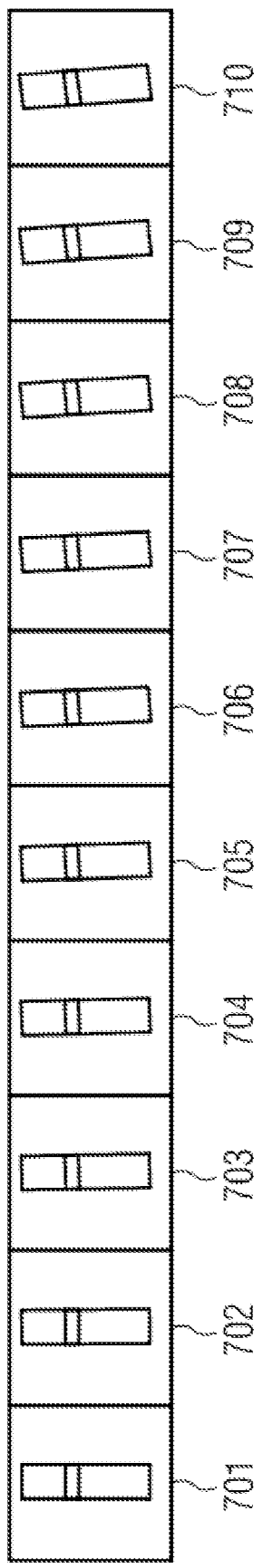
FIG. 7 shows a sequence of recordings of the same object rotated with respect to each other.

As indicated in FIG. 7, the second approach may e.g. exclusively be used for objects extending vertically above the user. For example, while the representation of the virtual environment is output to the user the recording device may be aligned vertically with respect to a straight direction of view of the user in the real environment. In other words: The recording device in the real environment may be aligned heavenward and/or in the direction of the ceiling of a room or a hall in which the user moves. The object may accordingly e.g. either be an illumination device, a (roof) window, a carrier, a beam at the ceiling of the room and/or the hall. Accordingly, the plurality of comparison recordings in the database may e.g. comprise different recordings of the ceiling of the room and/or hall. Alternatively, the recording device in the real environment may also be aligned in the direction of the floor of a room or a hall in which the user moves. The object may then e.g. be a light source inserted into the floor (laser, LED) or a mark (e.g. an emergency designation) like e.g. an arrow (e.g. illuminated arrow). Generally, an object according to the present disclosure may also be an especially designated object, like e.g. an especially colored object (chroma keying).

If the representation of the virtual environment is again output to the user via a display device mounted to the head of the user, the display device may further comprise the recording device. The display device may here again comprise a mobile communications device including fixing device for mounting the mobile communications device to the head of the user. By this, a camera of the mobile communications device may be used as a recording device. Thus, a calibration of the representation of the virtual environment may be enabled without additional hardware components. To be able to make recordings of the ceiling or the floor of the room and/or the hall using the camera of the mobile communications device, e.g. a periscope-like device may be used wherein one opening is directed to the ceiling or the floor and wherein the other opening is directed towards the lens of the camera of the mobile communications device. Via mirrors and/or prisms in the interior of the periscope-like device incident light beams may be deflected from the original direction of incidence (perpendicular to the first opening) towards the desired output direction (perpendicular to the second opening).

To simplify image registration and thus reduce the necessary computing power the plurality of comparison recordings may be binary recordings. Accordingly, determining the rotation of the recording of the object relative to the comparison recording comprises converting the recording of the object into a binary recording of the object and determining the rotation of the binary recording of the object relative to the comparison recording. For determining the rotation of the binary recording of the object relative to the comparison recording again the above mentioned image registration methods may be used.

Furthermore, the resolution of the plurality of comparison recordings may be limited (e.g. to 320×240 pixels) to save computing power. Accordingly, the method may comprise scaling the recording of the object, i.e. the original resolution is scaled to a target resolution (e.g. from 1920×1080 pixels to 320×240 pixels). As indicated, the target resolution may be lower than the original resolution. Due to the reduced number of pixels in the recording of the object computing time may be saved.

Instead of comparing the complete recording to a reference recording, the orientation of the object in the recording may be determined and compared to a reference direction (e.g. according to the methods described in context with FIGS. 9a to 9d) to determine the orientation of the recording device in the real environment.

Figure 8:
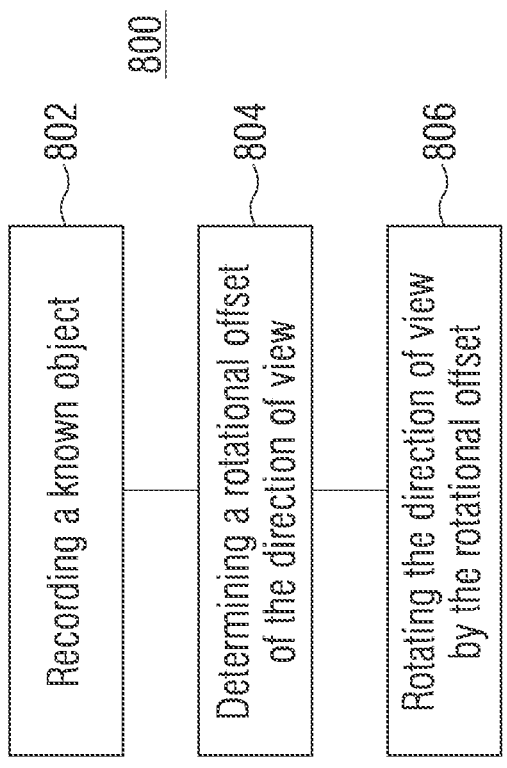
FIG. 8 shows a further example of a method for setting a direction of view in a representation of a virtual environment.

In the following, in FIG. 8 a method 800 for setting a direction of view in a representation of a virtual environment according to a second aspect of the present disclosure is illustrated.

Here, the method 800 comprises recording 802 a known object in a real environment using a recording device—as described hereinabove. I.e., the recording may e.g. be a still picture, a video or a sound recording. Accordingly, the recording device may comprise a still camera, a video camera, a sound recording device or a combination thereof.

Further, the method 800 comprises determining 804 a rotational offset of the direction of view in the representation of the virtual environment around the yaw axis of the representation of the virtual environment based on the recording of the object and a current direction of view in the representation of the virtual environment. The current direction of view in the representation of the virtual environment may, for example, be received by a display device (e.g. HMD, HMU) which outputs the representation of the virtual environment to the user (and optionally calculates the same) or by a computer which calculates the virtual environment (e.g. back end of a VR system).

The recording device may here—as described hereinabove—spatially be located in close proximity to the user (e.g. at the head of the user). From the recording of the object the orientation of the recording device in the real environment may be determined, which may then assumed to be the approximate orientation of the head of the user in the real environment. Therefrom, using the information on the current direction of view in the representation of the virtual environment, the rotational offset of the direction of view in the representation of the virtual environment around the yaw axis of the representation of the virtual environment may be determined. Some examples for the determination of the orientation of the recording device in the real environment and also for the determination of the rotational offset of the direction of view in the representation of the virtual environment are explained in more detail in the following description.

The method 800 further comprises rotating 806 the direction of view in the representation of the virtual environment by the rotational offset. In other words: The direction of view in the representation of the virtual environment is corrected by a rotation around the yaw axis of the representation of the virtual environment, wherein the direction and the magnitude of the rotation are determined by the rotational offset. The representation of the virtual environment is thus corrected by the rotational offset. The representation of the virtual environment may thus be adapted to the actual position and orientation of the head of the user in the real environment. Among other things, also the method 800 allows a calibration of the direction of view in the representation of the virtual environment. In particular, also using the method 800 an erroneously determined orientation in the real environment and/or a drifting of the direction of view in the representation of the virtual environment caused by measurement errors of the conventionally used sensors for determining the position and the alignment (of the head) of a user may be corrected.

Just like method 100 also method 800 may in some embodiments further comprise outputting the representation of the virtual environment to a user. Outputting the representation of the virtual environment to the user may here e.g. be executed via a display device mounted to the head of the user which further comprises the recording device. In such an arrangement the orientation of the recording device in the real environment may be assumed to be approximately the orientation of the head of the user in the real environment.

In some embodiments, the display device mounted to the head of the user comprises a mobile communications device (e.g. a smartphone). As indicated above, in a conventional operation of the VR system sensors already existing in the mobile communications device (e.g. gyroscope, magnetometer, accelerometer) may be used for determining the orientation of the head of the user in the real environment. By using the camera of the mobile communications device as a recording device, a rotational offset of the direction of view in the representation of the virtual environment around the yaw axis of the representation of the virtual due to measurement errors of the sensors of the mobile communications device may be corrected. For the calibration of the representation of the virtual environment, thus resources may be used already provided by the mobile communications device. In other words: The method 800 may be executed directly (i.e. online) on the mobile communications device. Also the method 800 may thus enable a calibration of the representation of the virtual environment without additional hardware components. Alternatively, e.g. a part of the method 800 may be executed by the mobile communications device and another part of the method 800, like e.g. determining 804 the rotational offset of the direction of view in the representation of the virtual environment around the yaw axis of the representation of the virtual environment may be executed by an already existing back end of the VR system used by the user (i.e. offline). The determined rotational offset may then e.g. be transmitted from the back-end to the mobile communications device so that the same may rotate the direction of view in the current representation of the virtual environment by the rotational offset. The above described functionality may e.g. be implemented by an update for one or several already existing software components of the VR system (e.g. software for the mobile communications device or software for the back end).

In some embodiments, determining 804 the rotational offset of the direction of view in the representation of the virtual environment around the yaw axis of the representation of the virtual environment may comprise determining an orientation of the recording device in the real environment based on the recording of the object and a reference direction (exemplary methods will be discussed in the following). The reference direction is a direction in the real environment whose orientation relative to the object is known. In other words: Information on the orientation of the object relative to the reference direction is used for determining the orientation of the recording device in the real environment. Further, determining 804 the rotational offset may comprise determining a target direction of view in the representation of the virtual environment based on the orientation of the recording device in the real environment. For example, the determined orientation of the recording device in the real environment may be provided to an algorithm for the calculation of the representation of the virtual environment which calculates a representation of the virtual environment based thereon. In particular when the recording device is arranged at the head of the user, the target direction of view in the virtual environment may be the direction of view in the virtual environment which corresponds to the actual position and orientation of the head of the user in the real environment. For example, the recording device may be aligned vertically to the straight ahead direction of view of the user in the real environment. The direction of view in the calculated representation of the virtual environment may consequently be regarded as the target direction of view.

From the target direction of view in the representation of the virtual environment and the current direction of view in the representation of the virtual environment, according to embodiments, now the rotational offset of the direction of view in the representation of the virtual environment around the yaw axis of the representation of the virtual environment is determined. This may, for example, be done by a comparison of the target direction of view and the current direction of view in the representation of the virtual environment. In other words: It is determined to what extent the current direction of view in the representation of the virtual environment is rotated relative to the target direction of view in the representation of the virtual environment around the yaw axis of the representation of the virtual environment.

In the following FIGS. 9*a* to 9*d* exemplarily two different approaches for determining the orientation of the recording device in the real environment on the basis of an orientation of the object in the recording and a reference direction are explained.

Figure 9B:
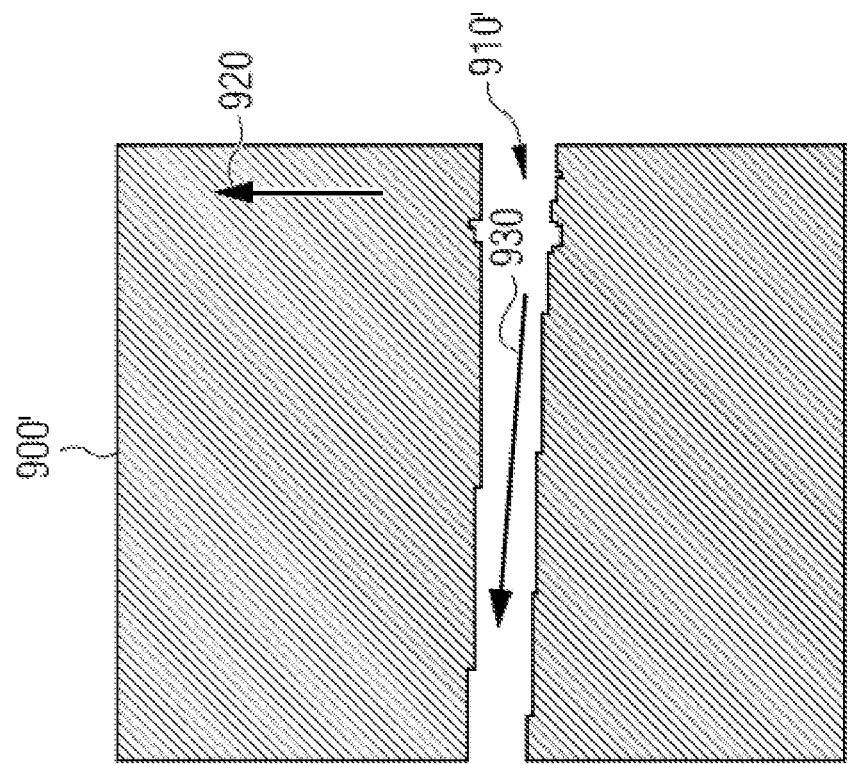
Figure 9A:
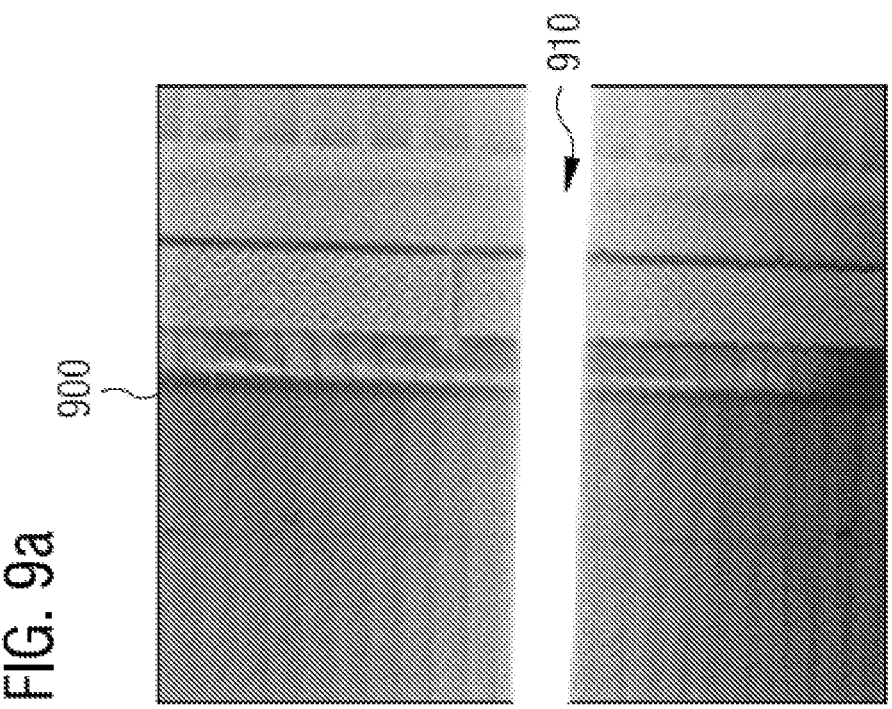
FIG. 9a shows a recording of a fifth example of an object.

For explaining the first approach in FIG. 9*a* a recording 900 of the roof of a hall is illustrated in which the user moves in the real environment. The recording 900 here shows a part of a longitudinal illumination device 910 representing an exemplary object. The object here is not restricted to longitudinal illumination devices. The object may e.g. also be a window, a carrier or a pattern at the ceiling of the hall and/or generally a room in the real environment in which the user moves. The object may generally be an object extending exclusively vertically above the user. Accordingly, the recording device may be oriented vertically to a straight direction of view of the user in the real environment, i.e. the recording device may be oriented heavenward and/or towards the ceiling. Alternatively, the recording device in the real environment may also be aligned in the direction of the floor of a room or a hall in which the user moves. The object may then e.g. be a light source inserted into the floor (laser, LED) or a mark (e.g. an emergency designation) like e.g. an arrow (e.g. illuminated arrow). If outputting the representation of the virtual environment to the user is executed via a display device mounted to the head of the user which again comprises a mobile communications device including fixing device for mounting the mobile communications device to the head of the user, a camera of the mobile communications device may be used as a recording device. Thus, a calibration of the representation of the virtual environment may be enabled without additional hardware components. To be able to make recordings of the ceiling or the floor of the room and/or the hall using the camera of the mobile communications device, e.g. a periscope-like device may be used wherein one opening is directed to the ceiling or the floor and wherein the other opening of the same is directed towards the lens of the camera of the mobile communications device.

Determining the orientation of the recording device in the real environment, according to the first approach, comprises converting the recording of the object into a binary recording of the object. The binary recording 900' corresponding to the recording 900 is illustrated in FIG. 9b. To generate the binary recording, optionally e.g. an environment-depending threshold value may be determined and/or defined for the separation between the two possible states in the binary recording. Furthermore, the method comprises detecting candidates for the object in the binary recording of the object. In the binary recording 900' it is the area 910' which corresponds to the longitudinal illumination device 910. In the binary recording 900' only one candidate 910' for the object is illustrated, depending on the recording made, however, also two, three, four or more candidates for the object may be detected in the recording and/or the corresponding binary recording. In this respect, optionally first the respective large and/or small principal axis and also the gravity center of a candidate may be determined.

The method further comprises determining a respective (linear) eccentricity e of the candidates for the object. I.e., for each of the detected candidates an eccentricity is determined. The determined linear eccentricity allows to estimate whether the possible candidate is a rather circular (e≈0) or a rather longitudinal (e≈1) object. For the binary recording 900' thus the eccentricity of the area 910' which is the only candidate in the image, is determined. As the area 910' is longitudinal, for the same a value of eccentricity of approximately one is determined.

Further, the method comprises determining an orientation of a main axis of the one candidate whose eccentricity is above a threshold value and whose main axis is longer than main axes of the other candidates for the object with an eccentricity above the threshold value as an orientation of the object in the recording. For all candidates thus their determined eccentricity is compared to a threshold value to determine the candidates which represent a longitudinal object. For example, the threshold value may thus be 0.5, 0.55, 0.6, 0.65, 0.7, 0.75, 0.8, 0.85 or 0.9. Out of the remaining candidates for the object the one with the longest main axis is selected. The orientation of this candidate in the recording is determined to be the orientation of the object in the recording.

The orientation of the candidate in the recording may e.g. be determined on the basis of an auxiliary vector 920, the auxiliary vector 920 indicating the straight direction of view of the user. Defining the auxiliary vector 920 to be in the straight direction of view of the user may enable to regard the orientation of the recording device as being basically identical to the orientation of the user in the real environment. Accordingly, from the determined orientation of the recording device the respective direction of view in the virtual environment may be determined as the target direction of view in the representation of the virtual environment which corresponds to the actual position and orientation of the head of the user in the real environment. For the area 910' it may thus be determined that the orientation 930 of its main axis spans an angle of 89° with respect to the auxiliary vector 920. I.e., the main axis of the area 910' is rotated by 89° with respect to the auxiliary vector. Thus, the orientation 930 of the main axis of the area 910' is determined to be the orientation of the object in the recording.

Together with the information on the reference direction, from the orientation of the object in the recording the orientation of the recording device may be determined. As indicated above, the reference direction is a direction in the real environment whose orientation relative to the object is known. In other words: The orientation (alignment) of the object relative to the reference direction is known. The reference direction may e.g. be determined for a known environment or be determined from reference recordings. If the user moves in the real environment, e.g. within a hall with a basically rectangular footprint, a corner of the footprint may be determined to be the origin. Starting from the origin (analog to the example shown in FIG. 2) three orthogonal spatial axes X, Y and Z may be defined. From the defined original point in the corner of the footprint X may e.g. point to the right (i.e. basically along a first boundary of the footprint), Y may point upwards (i.e. heavenward) (i.e. be basically perpendicular to the footprint) and Z may point into the depth (i.e. to the front) (i.e. basically along a second boundary of the footprint which is orthogonal to the first boundary of the footprint). The unity direction Y thus corresponds to the yaw axis, i.e. a rotation around this axis horizontally shifts a recording. The spatial axis Z may then e.g. be selected to be the reference direction which passes basically along the second boundary of the footprint. The orientation of the object—in the example shown in FIG. 9a thus the longitudinal illumination device 910—relative to the reference direction is known. For example, the longitudinal illumination device 910 may be orthogonal to the reference direction Z, i.e. parallel to the spatial direction X.

From the determined orientation of the object in the recording and the known orientation of the object relative to the reference direction now the orientation of the recording device may be determined. In the above example, thus the orientation of the auxiliary vector 920 in the real environment is determined. Thus, an orientation of the recording device in the plane spanned by spatial directions Y and Z may be determined.

To save computing power, the resolution of the recording to be assessed may be limited (e.g. to 320×240 pixels). Accordingly, the method may comprise scaling the recording of the object, i.e. the original resolution is scaled to a target resolution (e.g. from 1920×1080 pixels to 320×240 pixels). As indicated, the target resolution may be lower than the original resolution. Due to the reduced number of pixels in the recording of the object computing time may be saved.

Within the scope of the description of FIGS. 9c and 9d, in the following the second approach for determining the orientation of the recording device in the real environment on the basis of an orientation of the object in the recording and a reference direction are explained.

Figure 9D:
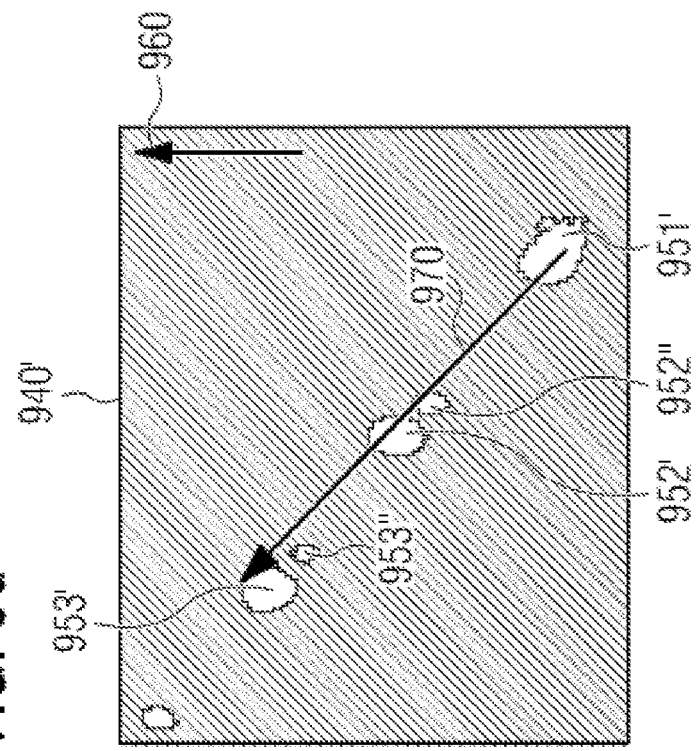
FIG. 9d shows a binary recording corresponding to the recording illustrated in FIG. 9b.
Figure 9C:
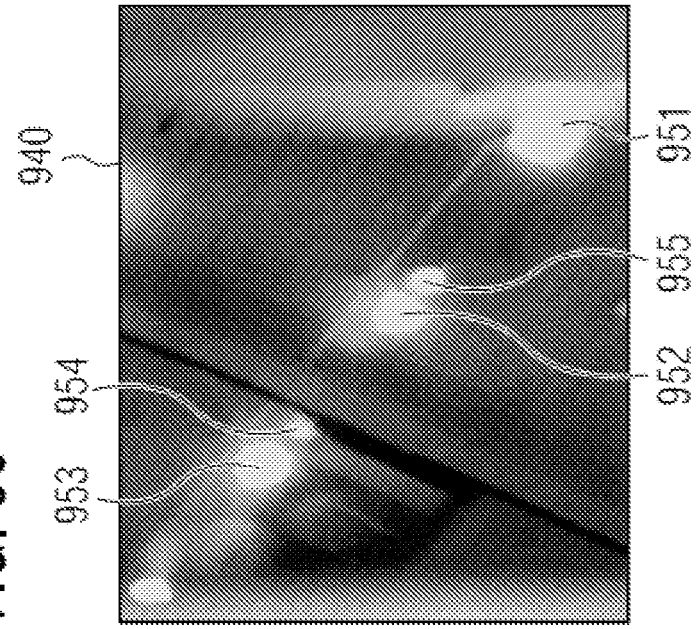
FIG. 9c shows a recording of a sixth example of an object.

For explaining the second approach, in FIG. 9c a recording 940 of the roof of a hall is illustrated in which the user moves in the real environment. The recording 900 here shows a (linear) arrangement of circular illumination devices 951, 952, 951 representing an exemplary object. The object here is not restricted to an arrangement of circular illumination devices. The object may generally be any arrangement of circular objects at the ceiling of the hall and/or generally of a room in the real environment in which the user moves. The object may generally be an object extending exclusively vertically above the user. Alternatively, the recording device in the real environment may also be aligned in the direction of the floor of a room or a hall in which the user moves. The object may then e.g. be a light source inserted into the floor (laser, LED) or a mark, like e.g. an arrow. Accordingly, the recording device may be oriented vertically to a straight direction of view of the user in the real environment, i.e. the recording device may be oriented heavenward (i.e. to the ceiling) and/or towards the floor. If outputting the representation of the virtual environment to the user is executed via a display device mounted to the head of the user which again comprises a mobile communications device including fixing device for mounting the mobile communications device to the head of the user, a camera of the mobile communications device may be used as the recording device. Thus, a calibration of the representation of the virtual environment may be enabled without additional hardware components. To be able to make recordings of the ceiling or the floor of the room and/or the hall using the camera of the mobile communications device, e.g. a periscope-like device may be used wherein one opening of the same is directed to the ceiling or the floor and wherein the other opening is directed towards the lens of the camera of the mobile communications device.

Determining the orientation of the recording device in the real environment, according to the second approach, again comprises converting the recording of the object into a binary recording of the object. The binary recording 940' corresponding to the recording 940 is illustrated in FIG. 9d. To generate the binary recording, optionally e.g. an environment-depending threshold value may be determined and/or defined for the separation between the two possible states in the binary recording.

Furthermore, the method comprises detecting circular objects in the binary recording of the object. Respective radii of the circular objects are here comprised in a predetermined value range. In other words: Only circular objects are detected whose value for the radius is greater than a first threshold value and smaller than a second threshold value. The threshold values may here be selected on the basis of information on the real environment in which the user is moving (e.g. height of the roof and/or distance of the illumination devices from the floor, dimensions of the illumination devices). For detecting circular objects in the binary recording e.g. a Circular Hough Transfrom (CHT) based algorithm may be used. Accordingly, in the binary recording the circular objects 951', 952' and 953' are detected which correspond to the arrangement of circular illumination devices 951, 952, 953 in the recording 940. The light areas 952" and 953" in the binary recording 940', however, adjacent to the areas 952' and 953' are no circular objects as they do not fulfill the radius criterion. The light areas 952" and 953" in the binary recording 940' adjacent to the areas 952' and 953' correspond to the optical effects 954, 955 in the recording 940 and thus do not represent objects in the real environment. Thus, with the help of the radius criterion optical interference and/or disruptive effects may be excluded from the further method of determining the orientation of the recording device.

Further, the method comprises determining distances of the circular objects from one another. In this respect, e.g. the center points of the circular objects 951', 952' and 953' may be determined and the distances of the center points to each other may be determined. Also the radii of the respective circular objects may be comprised in the distance determination.

Additionally, determining the orientation of the recording device in the real environment according to the second approach comprises determining the orientation of the object in the recording on the basis of the distances of the circular objects from one another. From the distances of the circular objects a relation between the individual circular objects may be determined. Here, e.g. again information on the real environment in which the user is moving may be used. In the example shown in FIGS. 9c and 9d, e.g. the distances between the individual illumination devices in the linear arrangement of circular illumination devices 951, 952, 953 in the real environment and the distance of the linear arrangement of circular illumination devices 951, 952, 953 to a further linear arrangement of circular illumination devices (not shown in FIG. 9c) may be used. In general, information on the geometry and condition of the area in the real environment (e.g. ceiling of a room or a hall) detectable by the recording device may be included in the determination of the relation of the individual objects to each other.

In FIG. 9d it is determined for the distances of the circular objects 951', 952' and 953' to each other that the same correspond to the distances of a linear arrangement of illumination devices in the real environment and that the circular objects 951', 952' and 953' thus represent a known object in the real environment. Accordingly, from the respective positions of the circular objects 951', 952' and 953' in the binary recording a directional vector 970 of the object in the recording represented by the circular objects 951', 952' and 953' is determined. In this respect, e.g. a straight line may be fitted to the center points of the circular objects 951', 952' and 953'.

The orientation of the directional vector 970 (i.e. the object) in the recording may e.g. be determined on the basis of an auxiliary vector 960 indicating e.g. the straight direction of view of the user. For the directional vector 970 it may thus be determined that the orientation of the object spans an angle of 35° with respect to the auxiliary vector 960. I.e., the linear arrangement of circular illumination devices 951, 952, 953 represented by the directional vector 970 is rotated by 35° with respect to the auxiliary vector 960. Thus, the orientation of the directional vector 970 is determined as an orientation of the object in the recording.

Together with the information on the reference direction, from the orientation of the object in the recording the orientation of the recording device may be determined. As indicated above, the reference direction is a direction in the real environment whose orientation relative to the object is known. With reference to the coordinate system XYZ exemplarily introduced in the description of FIG. 9b, as a reference direction e.g. again the spatial axis Z may be selected which passes basically along the second boundary of the footprint. The orientation of the object—in the example shown in FIG. 9c thus the linear arrangement of circular illumination devices 951, 952, 951—relative to the reference direction is known. For example, the linear arrangement of circular illumination devices 951, 952, 951 may be orthogonal to the reference direction Z, i.e. parallel to the spatial direction X.

From the determined orientation of the object in the recording and the known orientation of the object relative to the reference direction now the orientation of the recording device may be determined. In the above example, thus the orientation of the auxiliary vector 960 in the real environment is determined. Thus, an orientation of the recording device in the plane spanned by spatial directions Y and Z may be determined.

To save computing power, the resolution of the recording to be assessed may be limited (e.g. to 320×240 pixels). Accordingly, the method may comprise scaling the recording of the object, i.e. the original resolution is scaled to a target resolution (e.g. from 1920×1080 pixels to 320×240 pixels). As indicated, the target resolution may be lower than the original resolution. Due to the reduced number of pixels in the recording of the object computing time may be saved.

In the approach described in context with FIGS. 9c and 9d it was assumed that the recording device makes recordings in a plane substantially orthogonal to a plane in which the user is moving. For example, that the user is moving in a hall and the recording device is making recordings of the ceiling of the hall at an angle of basically 90° to the same. However, the recording device may also be tilted with respect to the ceiling (e.g. when the recording device is mounted to the head of the user and the same makes a nodding or tilting movement with his head). To be able to correctly determine the distances of the circular objects in the binary recording also in such situations, additionally apart from a known position of the recording device in the real environment (e.g. position of the user in the real environment determined by the VR system) also actual measurement values e.g. of a gyroscope and/or an accelerometer of a mobile communications device used as a display device for the virtual environment and as a recording device may be utilized.

Current measurement values of a gyroscope and/or an accelerometer of a mobile communications device used as a display device for the virtual environment and as a recording device may generally also be used (i.e. in all embodiments of the present disclosure) to determine whether the moment is suitable to make a recording. For example, it may be determined that the recording device makes recordings only in a certain value range of the measurement values. It may thus be prevented, that recordings are assessed which comprise blurs or other image distortions due to the orientation of the recording device in the real environment. It may thus be avoided that an erroneous orientation of the recording device in the real environment is determined and thus the direction of view in the virtual environment is rotated by an erroneous rotational offset.

In some embodiments, via the display device mounted to the head of the user which comprises the recording device a recording of a light source mounted to the body of the user (e.g. waist, trouser waistband) is made. For example, a laser may be arranged at the torso of the user which emits a laser beam in the direction of a straight ahead movement of the user (i.e. basically along a straight direction of view of the user). Thus, the light source and/or the laser beam is the known object which is recorded by the recording device. From the current position of the recording device and the known position of the recording device at at least one previous point in time an orientation of the body in the real environment is determined (i.e. the motion vector at the time instant of the recording is assumed to be the orientation of the body). In other words: The orientation of the body in the real environment serves as a reference direction. From the orientation of the laser beam in the recording now the orientation of the recording device relative to the laser beam is determined. The orientation of the laser beam in the recording may e.g. be determined according to the method described in context with FIGS. 9a and 9b. As the direction of the laser beam corresponds to the reference direction, the absolute orientation of the recording device in the real environment may be determined from the recording of the laser beam. Accordingly, from the absolute orientation in the real environment a target direction of view in the representation of the virtual environment may be determined so that by a comparison with the current direction of view in the representation of the virtual environment again the rotational offset of the direction of view in the representation of the virtual environment around the yaw axis of the representation of the virtual environment may be determined. The direction of view in the representation of the virtual environment may then be rotated, i.e. corrected, by the rotational offset.

Figure 10:
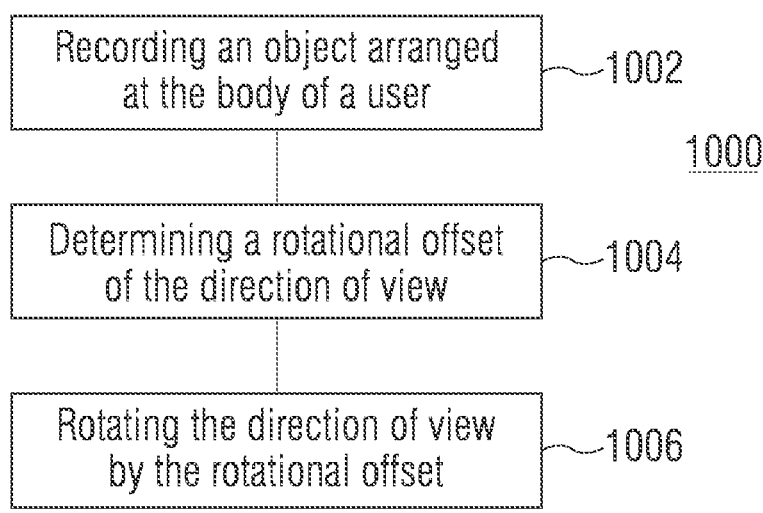
FIG. 10 shows a further example of a method for setting a direction of view in a representation of a virtual environment.

FIG. 10 shows a further method 1000 for setting a direction of view in a representation of a virtual environment.

The method 1000 here comprises recording 1002 an object arranged in a real environment at the body of the user using a recording device arranged at the head of the user at a first time instant $t_0$ and at a later second time instant $t_1$. The object may e.g. be of a light source mounted to the body of the user (e.g. waist, trouser waistband). For example, a laser may be arranged at the torso of the user which emits a laser beam in the direction of a straight ahead movement of the user (i.e. basically along a straight direction of view of the user).

A user may move his head by rotation around a transverse axis of the head, rotation around a longitudinal axis of the head, and/or rotation around a yaw axis of the head. The transverse axis, the longitudinal axis and the yaw axis of the head here are perpendicular to each other.

As the recording device is arranged at the head of the user, also the same is movable around the pitch/transverse axis, the roll/longitudinal axis and the yaw axis of the head.

As described hereinabove, the representation of the virtual environment may be output to the user via a display device mounted to the head of the user. In a conventional operation of the VR system then e.g. sensors (e.g. gyroscope, magnetometer, accelerometer) already existing in the mobile communications device (HMD) may be used for determining the orientation of the head of the user in the real environment. Thus, in particular a rotary position of the head around its yaw axis may be determined. However, determining the orientation of the head using the existing sensors—as illustrated above—is defective. Apart from the sensors above, i.e. at least one further sensor, the display device may further comprise the recording device. Thus, the method 1000 further comprises determining 1004 a rotational offset of the direction of view in the representation of the virtual environment around a yaw axis of the representation of the virtual environment based on the recordings of the object at the first time instant $t_0$ and a second time instant $t_1$ and measurement values of at least one further sensor mounted to the head of the user.

The rotational offset of the direction of view in the representation of the virtual environment around a yaw axis of the representation of the virtual environment here corresponds to a rotational offset of the recording device around the yaw axis of the head of the user. The same is determined by a comparison of the rotation of the recording device around a yaw axis of the head of the user determined from recordings of the object at time instants $t_0$ and $t_1$ and the rotation of the recording device around a yaw axis of the head of the user determined from the measurement values between the time instants $t_0$ and $t_1$ from the sensor mounted to the head of the user. Thus, the rotational offset of the direction of view in the representation of the virtual environment around the yaw axis of the representation of the virtual may be determined without having to determine the absolute orientation of the recording device and/or the head of the user in the real environment. Rather, it is sufficient, to determine the relative rotational offset of the recording device and/or the HMD around the yaw axis of the head.

The method 1000 thus further comprises rotating 1006 the direction of view in the representation of the virtual environment by the rotational offset. In other words: The direction of view in the representation of the virtual environment is corrected by a rotation around the yaw axis of the representation of the virtual environment, wherein the direction and the magnitude of the rotation are determined by the rotational offset. The representation of the virtual environment is thus corrected by the rotational offset. The representation of the virtual environment may thus be adapted to the actual position and orientation of the head of the user in the real environment. Among other things, also the method 1000 allows a calibration of the direction of view in the representation of the virtual environment. In particular, also using the method 1000 an erroneously determined orientation in the real environment and/or a drifting of the direction of view in the representation of the virtual environment caused by measurement errors of the conventionally used sensors for determining the position and the alignment (of the head) of a user may be corrected.

According to some embodiments, determining 1004 the rotational offset of the direction of view in the representation of the virtual environment around the yaw axis of the representation of the virtual environment incudes determining a first rotation of the recording device around the yaw axis of the head of the user between the first time instant $t_0$ and the second time instant $t_1$ based on the recordings of the object at the first time instant $t_0$ and at the second time instant $t_1$. Here, for the first time instant $t_0$ the orientation of the recording device relative to the laser beam is determined from the recording of the laser beam at the first time instant $t_0$. For example, the laser beam may be directed in the direction of a straight ahead movement of the user and the user is looking straight ahead, so that a rotation of the recording device around the yaw axis of the head by 0° relative to the laser beam is determined to be a first orientation. For the second time instant $t_1$ the orientation of the recording device relative to the laser beam is determined from the recording of the laser beam at the second time instant $t_1$. If the user has his head turned to the side at the time instant $t_1$, a second orientation of the laser beam different from the first orientation in the recording is determined, i.e. a rotation of the recording device around the yaw axis of the head relative to the laser beam different from 0°. The orientation of the laser beam in the recording may e.g. be determined according to the method described in context with FIGS. 9a and 9b. Thus, the relative rotational angle around the yaw axis of the head between the orientation of the head at a first time instant $t_0$ and the orientation of the head at the second time instant $t_1$ is determined from the two recordings.

Further, determining 1004 the rotational offset of the direction of view in the representation of the virtual environment around the yaw axis of the representation of the virtual environment in these embodiments incudes determining a second rotation of the recording device around the yaw axis of the head of the user between the first time instant $t_0$ and the second time instant $t_1$ based on the measurement values of at least one further sensor mounted to the head of the user. In other words: From the measurement values of at least one further sensor mounted to the head of the user between the time instants $t_0$ and $t_1$ again an effective (i.e. total) rotation around the yaw axis of the head is determined as a comparison value. Thus, the relative rotational angle around the yaw axis of the head between the orientation of the head at a first time instant $t_0$ and the orientation of the head at the second time instant $t_1$ is determined from the measurement values. Due to measurement errors of the sensors of the display device, however, the rotation around the yaw axis of the head determined from the measurement values may be erroneous. As the same is used in the VR system for the determination of the direction of view in the representation of the virtual environment, also the direction of view in the representation of the virtual environment may be erroneous, i.e. rotated around the yaw axis of the representation of the virtual environment.

Thus, determining 1004 the rotational offset of the direction of view in the representation of the virtual environment around the yaw axis of the representation of the virtual environment in this embodiment further comprises determining a rotational offset around the yaw axis of the head between the first rotation and the second rotation as a rotational offset of the direction of view in the representation of the virtual environment around the yaw axis of the representation of the virtual environment. In other words: The rotational offset around the yaw axis of the head between the first rotation and the second rotation represents the difference (i.e. the variation) between the first rotation determined from the recordings of the object and the second rotation determined from the measurement values of at least one further sensor. The resulting rotational offset around the yaw axis of the head of the user due to the measurement errors of the sensors of the display device (i.e. the HMD) is thus determined using the exact determination of the rotation of the display device relative to the object at the body of the user (e.g. the laser beam). The relative rotational offset of the recording device and/or the HMD around the yaw axis of the head may thus be assumed to be the rotational offset of the direction of view in the representation of the virtual environment around the yaw axis of the representation of the virtual environment, so that the same may accordingly be corrected by the rotational offset of the recording device and/or the HMD around the yaw axis of the head.

In the following FIGS. 11a and 11b exemplary connections between a motion vector of a user 1000 in the real environment, an actual direction of view $v_{real}$ of the user 1100 in the real environment and a direction of view $v_{vr}$ in the representation of the virtual environment determined from the measurement values of at least one further sensor arranged at the head 1102 of the user 1100. In the FIGS. 11a and 11b the user 1100 moves along the motion vector p between the first time instant $t_0$ and the later second time instant $t_1$, the vector being determinable e.g. by position measurements $m(t_0)$ and $m(t_1)$ at the two time instants $t_0$ and $t_1$.

Figure 11A:
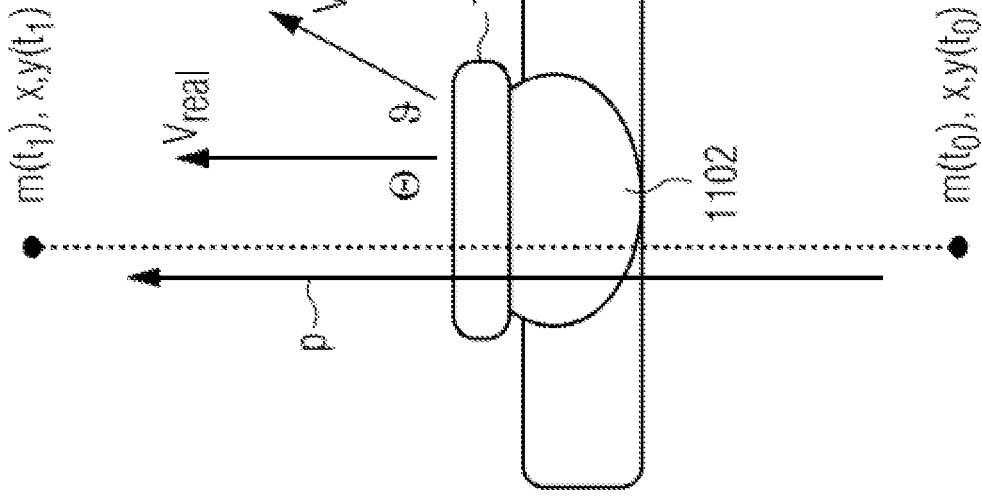
FIG. 11a shows an example of a connection between a motion vector of a user, an actual direction of view of the user and a direction of view determined from measurement values of at least one further sensor arranged at the head of the user in the representation of the virtual environment at a first time instant.

FIG. 11a here shows the situation at the first time instant $t_0$. At this time instant the user 1100 is looking straight ahead, i.e. in the direction of its motion vector p. The actual orientation of the head of the user is determined for the first time instant $t_0$ by means of a recording device included in a HMD 1104 arranged at the head 1102 of the user 1100. As indicated above, using the recording device a first recording of an object (e.g. light source; laser light source emitting laser beams) arranged at the body 1106 of the user 1100 is made and therefrom a relative orientation of the head with respect to the object is determined for the first time instant $t_0$. The alignment of the object relative to the body 1106 (e.g. torso) of the user 1100 is known here. For example, a laser beam may be directed in the direction of a straight ahead movement of the user 1100, so that a rotation of the recording device around the yaw axis of the head by 0° relative to the laser beam is determined as a first orientation. As the laser beam is directed in the direction of the straight ahead movement of the user 1100, the direction of the laser beam basically corresponds to the motion vector p of the user 1100 so that also the rotation θ of the recording device around the yaw axis of the head is known relative to the motion vector p of the user 1100, here a rotation by 0°. As the motion vector is known, thus the absolute orientation of the recording device and thus also of the head 1102 of the user 1100 in the real environment is known.

In the usual operation of the VR system and by means of at least one further sensor included in the HMD 1104 (e.g. gyroscope, magnetometer, accelerometer) also the orientation of the head 1102 of the user 1100 in the real environment and therefrom the direction of view $v_{vr}$ in the representation of the virtual environment is determined. For the first time instant $t_0$ now the direction of view of the user 1100 in the real environment determined from the measurement values of at least one further sensor arranged at the head 1102 of the user 1100 is assumed to be identical to the actual direction of view $v_{real}$ of the user 1100 in the real environment. Thus, also the direction of view $v_{vr}$ in the representation of the virtual environment would basically correspond to the motion vector p of the user 1100 so that between the actual direction of view $v_{real}$ of the user 1100 in the real environment and the direction of view $v_{vr}$ in the representation of the virtual environment a rotation of basically 0° may be assumed. In other words: The rotational offset around the yaw axis of the representation of the virtual is basically 0°.

Figure 11B:
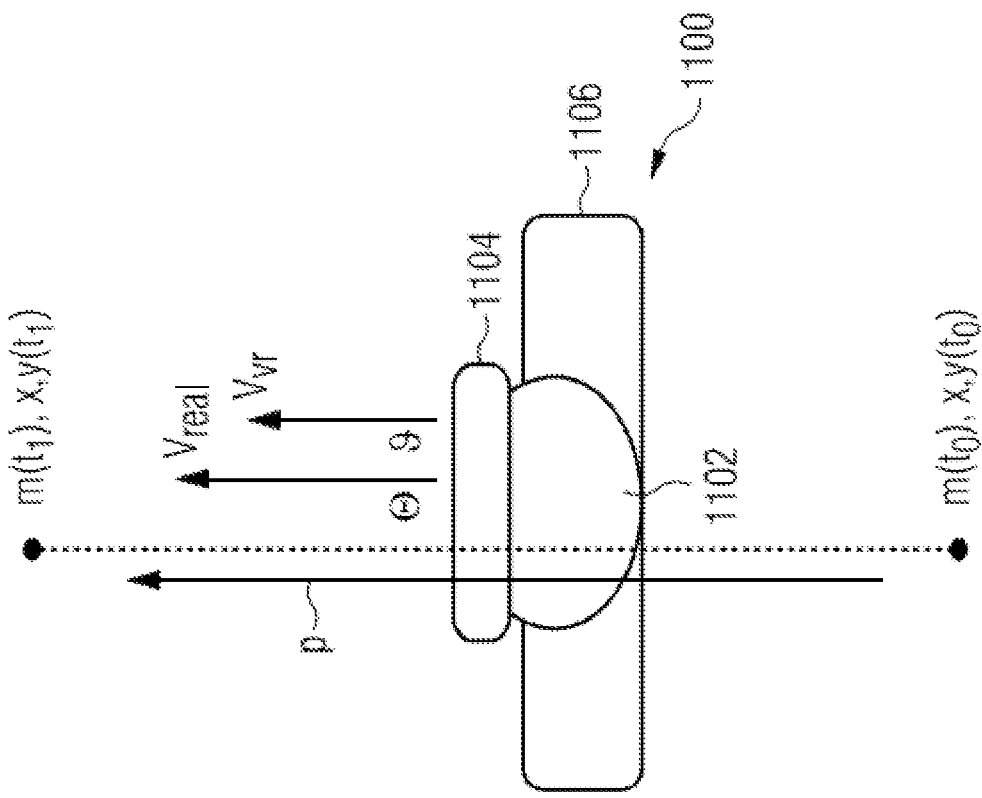
FIG. 11b shows an example of a connection between a motion vector of a user, an actual direction of view of the user and a direction of view determined from measurement values of at least one further sensor arranged at the head of the user in the representation of the virtual environment at a second time instant.

In FIG. 11*b* the situation at the second time instant $t_1$ is shown. At the second time instant $t_1$ the user 1100 is looking straight ahead, i.e. basically in the direction of its motion vector p. From the second recording of the object (e.g. laser) arranged at the body 1106 of the user at the second time instant $t_1$ thus again a rotation of the recording device around the yaw axis of the head of 0° relative e.g. to the laser beam is determined to be the second orientation, i.e., the rotation θ of the recording device around the yaw axis of the head relative to the motion vector p of the user 1100 is again 0°. For the second time instant $t_1$ now the direction of view of the user 1100 in the real environment determined from the measurement values of at least one further sensor arranged at the head 1102 of the user 1100 is not identical to the actual direction of view $v_{real}$ of the user 1100 in the real environment determined from the second recording due to measurement errors. Thus, the direction of view $v_v$r in the representation of the virtual environment erroneously does basically not correspond to the motion vector p of the user 1100, so that between the actual direction of view $v_{real}$ of the user 1100 in the real environment and the direction of view $v_v$r in the representation of the virtual environment a rotation ε different from 0° is present. In other words: The rotational offset around the yaw axis of the representation of the virtual environment is different to 0°. The consequence of the rotational offset different to 0° around the yaw axis of the representation of the virtual environment is that the user does not basically move along the motion vector p in the virtual environment but at an inclined angle to the same. If the user were e.g. walking straight ahead in the real environment, he would be moving at an angle to the front in the real environment.

In order to now correct the direction of view in the representation of the virtual environment, as illustrated above (see description of FIG. 11) the relative rotational offset around the yaw axis of the head 1102 of the user 1100 between the rotation determined from the two recordings and the rotation determined from the measurement values of at least one further sensor may be used. Alternatively, the absolute orientation of the recording device (and thus also of the head 1102) in the real environment determinable due to the knowledge of the relative orientation of the recording device to the known motion vector may be used to determine a target direction of view in the representation of the virtual environment and to correct the direction of view in the representation of the virtual environment by the rotational offset between the target direction of view and the current direction of view in the representation of the virtual environment (i.e. rotate around the yaw axis of the representation of the virtual environment). Thus, a calibration of the direction of view in the representation of the virtual environment may be enabled.

The features disclosed in the above description, the enclosed claims and the enclosed Figures may both individually and in any combination be of importance and implemented for realizing an embodiment in their various forms.

Although some aspects have been described in connection with an apparatus, it is clear that these aspects also illustrate a description of the corresponding method, where a block or a device of an apparatus is to be understood as a method step or a feature of a method step. Analogously, aspects described in the context of or as a method step also represent a description of a corresponding block or detail or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, a hard disc or another magnetic or optical memory having electronically readable control signals stored thereon, which cooperate or are capable of cooperating with a programmable hardware component such that the respective method is performed.

A programmable hardware component may be formed by a processor, a Central Processing Unit (CPU), a Graphics Processing Unit (GPU), a computer, a computer system, an Application-Specific Integrated Circuit (ASIC), an Integrated Circuit (IC), a System on Chip (SOC), a programmable logics element or a Field Programmable Gate Array (FPGA) comprising a microprocessor.

Therefore, the digital storage medium may be machine or computer readable. Some embodiments comprise also a data carrier comprising electronically readable control signals which are capable of cooperating with a programmable computer system or a programmable hardware component such that one of the methods described herein is performed. One embodiment is thus a data carrier (or a digital storage medium or a computer readable medium) on which the program for executing of the methods described herein is stored.

Generally speaking, embodiments of the present invention may be implemented as a program, firmware, a computer program or a computer program product having a program code or as data, wherein the program code or the data is effective to execute one of the methods when the program is executed on a processor, or a programmable hardware component. The program code or the data may, for example, also be stored on a machine-readable carrier or data carrier. The program code or the data may among others be present as a source code, machine code or byte code or any other intermediate code.

A further embodiment is a data stream, a signal sequence or a sequence of signals which may represent the program for executing one of the methods described herein. The data stream, the signal sequence or the sequence of signals may for example be configured so as to be transferred via a data communication connection, for example via the internet or another network. Embodiments thus also are signal sequences representing data suitable for being transferred via a network or a data communication connection, the data representing the program.

A program according to one embodiment may implement one of the methods during its execution for example by reading out memory locations or writing one or several data into the same, whereby possibly switching processes or other processes in transistor structures, in amplifier structures or in other electrical, optical, magnetic or other members operating according to another functional principle are caused. Accordingly, by reading out a memory location, data, values, sensor values or other information is determined, detected or measured by a program. By reading out one or several memory locations, a program may detect, determine or measure magnitudes, values, measured quantities and other information and, by writing into one or several memory locations, cause, trigger or execute an action and control other devices, machines and components.

The above described embodiments are merely an illustration of the principles of the present invention. It is understood that modifications and variations of the arrangements and the details described herein will be apparent to others skilled in the art. It is the intent, therefore, that this invention is limited only by the scope of the impending patent claims and not by the specific details presented by way of description and explanation of the embodiments herein.

The invention claimed is:

1. A method for setting a direction of view in a representation of a virtual environment, comprising:
   recording a known object in a real environment using a recording device;
   determining a rotational offset of the direction of view in the representation of the virtual environment around a yaw axis of the representation of the virtual environment based on the recording of the object, a known position of the recording device in the real environment and a current direction of view in the representation of the virtual environment for a time instant $t_0$; and
   rotating the direction of view in the representation of the virtual environment by the rotational offset,
   wherein the current direction of view in the representation of the virtual environment for the time instant $t_0$ is based on measurement values of a gyroscope, a magnetometer and/or an accelerometer, and
   wherein determining the rotational offset of the direction of view in the representation of the virtual environment around the yaw axis of the representation of the virtual environment comprises:
      determining an orientation of the recording device in the real environment based on the recording of the object and the known position of the recording device in the real environment;
      determining a target direction of view in the representation of the virtual environment for the time instant $t_0$ based on the orientation of the recording device in the real environment; and
      determining the rotational offset of the direction of view in the representation of the virtual environment around the yaw axis of the representation of the virtual environment from the target direction of view in the representation of the virtual environment for the time instant to and the current direction of view in the representation of the virtual environment for the time instant $t_0$.

2. The method according to claim 1, wherein determining the orientation of the recording device in the real environment comprises determining a transformation which correlates at least a part of the recording of the object with at least a part of a comparison recording.

3. The method according to claim 1, wherein determining the orientation of the recording device in the real environment further comprises:
   detecting a feature of the object in the recording;
   determining a position of the feature in the recording;
   identifying a comparison feature from a plurality of comparison features of a database which corresponds to the feature of the object in the recording, wherein a position in the real environment is associated with each of the plurality of comparison features; and
   determining the orientation of the recording device in the real environment based on the known position of the recording device in the real environment, the position of the feature in the recording and the position in the real environment associated with the identified comparison feature.

4. The method according to claim 3, wherein when determining the orientation of the recording device in the real environment several features of the object are detected, wherein an orientation of the recording device in the real environment is determined for each of the several detected features of the object, and wherein the one of the orientations of the recording device in the real environment determined for the several detected features of the object which fulfils a quality criterion is determined to be the orientation of the recording device in the real environment.

5. The method according to claim 3, wherein the plurality of comparison features comprises different features of the object.

6. The method according to claim 1, wherein the object is a pattern attached to a vertical plane.

7. The method according to claim 1, wherein the method further comprises outputting a representation of the virtual environment to a user and wherein the recording device is aligned in the straight direction of view of the user in the real environment.

8. The method according to claim 7, wherein outputting the representation of the virtual environment to the user is executed via a display device mounted to a head of the user and wherein the display device further comprises the recording device.

9. The method according to claim 8, wherein the display device comprises a mobile communications device and wherein the recording device is a camera of the mobile communication device.

10. The method according to claim 1, wherein determining the orientation of the recording device in the real environment comprises:
    determining, based on the known position of the recording device in the real environment, a comparison recording from a plurality of comparison recordings of a database, wherein an orientation of the comparison recording in the real environment is known;

determining a rotation of the recording of the object relative to the comparison recording;

determining the orientation of the recording device in the real environment based on the orientation of the comparison recording in the real environment and the rotation of the recording of the object relative to the comparison recording.

11. The method according to claim 10, wherein the plurality of comparison recordings are binary recordings and wherein determining the rotation of the recording of the object relative to the comparison recording comprises:

converting the recording of the object into a binary recording of the object; and determining the rotation of the binary recording of the object relative to the comparison recording.

12. The method according to claim 10, wherein the method further comprises outputting the representation of the virtual environment to a user and wherein the recording device is aligned vertically to a straight direction of view of the user in the real environment.

13. The method according to claim 12, wherein the object extends vertically exclusively above or exclusively below the user.

14. A method for setting a direction of view in a representation of a virtual environment, comprising:

recording a known object in a real environment using a recording device;

determining a rotational offset of the direction of view in the representation of the virtual environment around a yaw axis of the representation of the virtual environment based on the recording of the object and a current direction of view in the representation of the virtual environment for a time instant $t_0$; and rotating the direction of view in the representation of the virtual environment by the rotational offset, wherein the current direction of view in the representation of the virtual environment for the time instant $t_0$ is based on measurement values of a gyroscope, a magnetometer and/or an accelerometer, and wherein determining the rotational offset of the direction of view in the representation of the virtual environment around the yaw axis of the representation of the virtual environment comprises:

determining an orientation of the recording device in the real environment based on an orientation of the object in the recording and a reference direction;

determining a target direction of view in the representation of the virtual environment for the time instant $t_0$ based on the orientation of the recording device in the real environment; and determining the rotational offset of the direction of view in the representation of the virtual environment around the yaw axis of the representation of the virtual environment from the target direction of view in the representation of the virtual environment for the time instant $t_0$ and the current direction of view in the representation of the virtual environment for the time instant $t_0$.

15. The method according to claim 14, wherein determining the orientation of the recording device in the real environment comprises:

converting the recording of the object into a binary recording of the object;

detecting candidates for the object in the binary recording of the object;

determining a respective eccentricity of the candidates for the object; and determining an orientation of a main axis of the one candidate whose eccentricity is above a threshold value and whose main axis is longer than main axes of the other candidates for the object with an eccentricity above the threshold value as an orientation of the object in the recording.

16. The method according to claim 14, wherein determining the orientation of the recording device in the real environment further comprises:

converting the recording of the object into a binary recording of the object;

detecting circular objects in the binary recording of the object, wherein respective radii of the circular objects are included in a predetermined value range;

determining distances of the circular objects from one another;

determining the orientation of the object in the recording on the basis of the distances of the circular objects from one another.

17. The method according to claim 14, wherein the method further comprises outputting the representation of the virtual environment to a user and wherein the recording device is aligned vertically to a straight direction of view of the user in the real environment.

18. The method according to claim 17, wherein outputting the representation of the virtual environment to the user is executed via a display device mounted to a head of the user and wherein the display device further comprises the recording device.

19. The method according to claim 18, wherein the display device comprises a mobile communications device and wherein the recording device is a camera of the mobile communications device.

20. The method according to claim 17, wherein the object extends vertically exclusively above or exclusively below the user.

21. A method for setting a direction of view in a representation of a virtual environment, comprising:

recording an object arranged in a real environment at the body of a user using a recording device arranged at a head of the user at a first time instant and at a later second time instant;

determining a rotational offset of the direction of view in the representation of the virtual environment around a yaw axis of the representation of the virtual environment based on the recordings of the object at the first time instant and at the second time instant and measurement values of at least one further sensor mounted to the head of the user; and rotating the direction of view in the representation of the virtual environment by the rotational offset.

22. The method according to claim 21, wherein determining the rotational offset of the direction of view in the representation of the virtual environment around the yaw axis of the representation of the virtual environment further comprises:

determining a first rotation of the recording device around a yaw axis of the head of the user between the first time instant and the second time instant based on the recordings of the object at the first time instant and at the second time instant;

determining a second rotation of the recording device around the yaw axis of the head of the user between the first time instant and the second time instant based on the measurement values of at least one further sensor mounted to the head of the user; and determining the rotational offset between the first rotation and the second rotation as the rotational offset of the direction of view in the representation of the virtual environment around the yaw axis of the representation of the virtual environment.

23. The method according to claim 21, wherein the method further comprises outputting the representation of the virtual environment to the user via a display device mounted to the head of the user and wherein the display device further comprises the recording device and the at least one further sensor.

* * * * *

UNITED STATES PATENT AND TRADEMARK OFFICE
CERTIFICATE OF CORRECTION

PATENT NO. : 10,885,663 B2
APPLICATION NO. : 16/302110
DATED : January 5, 2021
INVENTOR(S) : Mutschler et al.

Page 1 of 1

It is certified that error appears in the above-identified patent and that said Letters Patent is hereby corrected as shown below:

In the Claims

In Claim 1, Column 30, Line 10 the word 'to' should read as -$t_0$-.

Signed and Sealed this
First Day of June, 2021

Drew Hirshfeld
*Performing the Functions and Duties of the
Under Secretary of Commerce for Intellectual Property and
Director of the United States Patent and Trademark Office*